(12) United States Patent
Huynh et al.

(10) Patent No.: US 11,501,145 B1
(45) Date of Patent: Nov. 15, 2022

(54) MEMORY OPERATION FOR SYSTOLIC ARRAY

(71) Applicant: Amazon Technologies, Inc., Seattle, WA (US)

(72) Inventors: Jeffrey T. Huynh, San Jose, CA (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 574 days.

(21) Appl. No.: 16/573,201

(22) Filed: Sep. 17, 2019

(51) Int. Cl.
*G06N 3/063* (2006.01)
*G06N 3/02* (2006.01)
*G06F 15/80* (2006.01)

(52) U.S. Cl.
CPC ......... *G06N 3/063* (2013.01); *G06F 15/8046* (2013.01); *G06N 3/02* (2013.01)

(58) Field of Classification Search
None
See application file for complete search history.

(56) References Cited

U.S. PATENT DOCUMENTS

| | | | |
|---|---|---|---|
| 10,587,294 B1* | 3/2020 | Arabaci | H03H 17/0266 |
| 10,613,977 B1* | 4/2020 | Diamant | G06F 12/0207 |
| 2016/0357840 A1* | 12/2016 | Odashima | G06F 16/283 |
| 2019/0026237 A1* | 1/2019 | Talpes | G06N 3/0454 |
| 2019/0114529 A1* | 4/2019 | Ng | G06N 3/063 |
| 2019/0294413 A1* | 9/2019 | Vantrease | G06N 3/063 |

* cited by examiner

*Primary Examiner* — Eric Coleman
(74) *Attorney, Agent, or Firm* — Kilpatrick Townsend & Stockton LLP

(57) ABSTRACT

In one example, a neural network accelerator executes instructions to: load a first weight data element of an array of weight data elements from a memory into a systolic array; extract, from the instructions, information indicating a first number of input data elements to be obtained from a first address of the memory and a second number of input data elements to be skipped between adjacent input data elements to be obtained, the first address being based on first coordinates of the first weight data element, and the first and second numbers being based on a stride of a convolution operation; based on the information, obtain first input data elements from the first address of the memory; and control the systolic array to perform first computations based on the first weight data element and the first input data elements to generate first output data elements of an output data array.

20 Claims, 28 Drawing Sheets

| Weight data elements coordinates | (0, 0) | (1, 1) | (2, 2) |
|---|---|---|---|
| Start Address | Address of input data element (1, 1) | Address of input data element (0, 0) | Address of input data element (1, 1) |
| Number of fetch elements | 18 | 30 | 27 |
| step | 2 | 2 | 2 |
| Destination offset | 11 | 0 | 0 |
| Number of write elements | 18 | 30 | 27 |
| step | 1 | 1 | 1 |

| Input data elements co-ordinates | Chunk ID | Chunk location |
|---|---|---|
| (0, 0) | 0 | Offset 0 |
| (0, 1) | 0 | Offset 0 |
| ... | ... | ... |
| (4, 19) | 0 | Offset 0 |
| (5, 0) | 1 | Offset 1024 |
| (5, 1) | 1 | Offset 1024 |
| ... | ... | ... |

MEMORY OPERATION FOR SYSTOLIC ARRAY

BACKGROUND

Artificial neural networks are computing systems with an architecture based on biological neural networks. Artificial neural networks can be trained, using training data, to learn about how to perform a certain computing task for an application.

A hardware accelerator, such as a neural network processor, can be programmed to implement an artificial neural network to perform the computing task. One common computing task is a convolution operation between a weight data matrix and an input data matrix. In a convolution operation, the weight data matrix can traverse through and superimpose with the input data matrix in multiple strides until the entire input data matrix has been traversed. For each stride, a sum of multiplications between the weight data matrix and the superimposed portions of the input data matrix can be generated as an output of the convolution operation, and multiple outputs of the convolution operation can be generated at the multiple strides. There are many applications of convolution operation, such as extracting features from an image, performing image recognition, etc.

The input data matrix and the weight data matrix are stored in a memory, which can be accessed to fetch the input data and the weight data to a systolic array of the hardware accelerator to perform the convolution operation. The organization of the data in the memory, especially for the typically large input data, can affect the utilization of memory resource, as well as the efficiency of the memory access operations, both of which can affect the performance of the neural network processor.

BRIEF DESCRIPTION OF THE DRAWINGS

Various embodiments in accordance with the present disclosure will be described with reference to the drawings, in which:

FIGS. 5A-5D illustrate operations at the example neural network processor of FIGS. 4A-4C for a normal convolution operation, according to certain aspects of the present disclosure;

FIGS. 7A-7D illustrate example components of a compiler and their operations to support the memory operations of FIGS. 6A-6C, according to certain aspects of the present disclosure;

DETAILED DESCRIPTION

Figure 1:
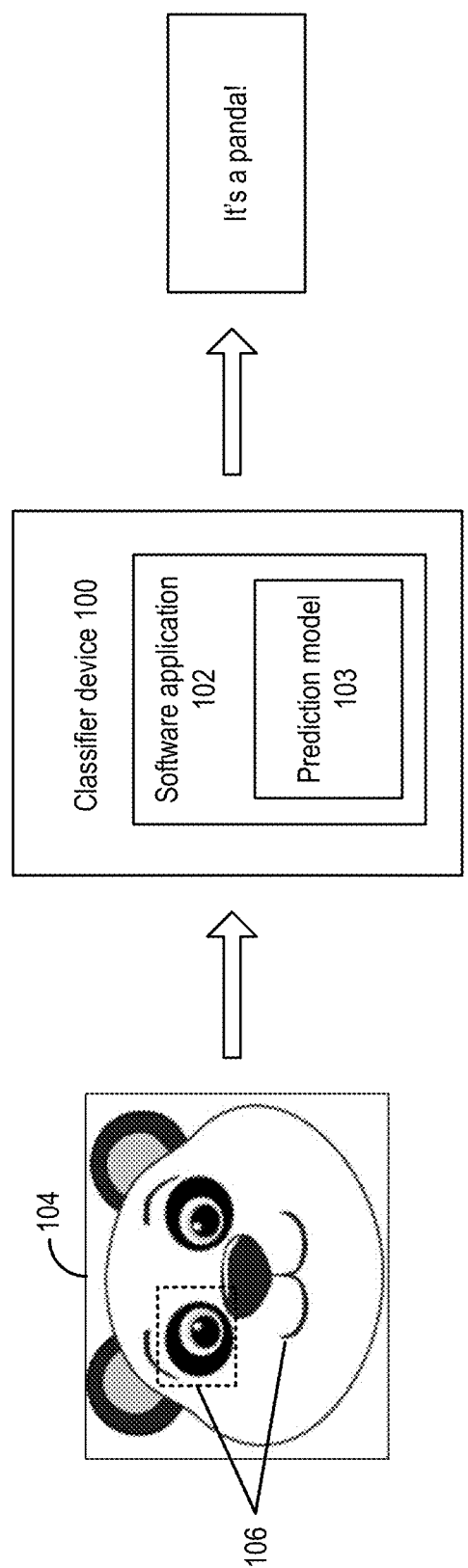
FIG. 1 illustrates an example a classifier device that uses techniques disclosed herein to process data.

Examples of the present disclosure relate to neural network processing, and more specifically, to performing memory operations to support a convolution operation at a neural network processor, as well as hardware and/or software systems to support the memory operations at the neural network processor.

A hardware accelerator, such as a neural network processor, can be programmed to implement an artificial neural network to perform a computing task. One common computing task is a convolution operation between a weight data matrix configured as a filter and an input data matrix. The input data matrix can correspond to pixels of an image, whereas the filter can include an array of filter coefficients configured to extract a target feature from the image. As part of the convolution operation, the filter can traverse through different locations of the image in multiple strides. At each stride location, a sum of products between each filter coefficient and an overlapping pixel of the image can be generated as a convolution output for that stride location. The convolution output can indicate, for example, whether the image contains the target feature, the image location of the target feature, etc. The input data matrix and the weight data matrix are stored in a memory, which can be accessed to fetch the input data and the weight data to a systolic array of the hardware accelerator to perform the convolution operation. The memory can be an on-chip memory (e.g., a cache of the hardware accelerator), an off-chip memory (e.g., a dynamic random access memory (DRAM)), etc.

The organization of the data in the memory, especially the typically large input data, can affect the utilization of memory resource, as well as the efficiency of the memory access operations, both of which can affect the performance of the neural network processor. For example, in a convolution operation the neural network processor may multiply the weight data matrix with a group of overlapping input data elements at a stride location. If the group of overlapping input data elements to be accessed are scattered at different locations within the memory, multiple memory access operations, rather than a single memory access operation, may be needed to access the group of input data elements, which can add latency and reduce the efficiency of the memory access operations. Moreover, as the memory addresses and the coordinates of the input data elements may not have any fixed relationship with each other, the neural network processor may need to employ an address translation scheme to obtain the actual addresses to access the memory for the input data elements, which can further increase the latency of the memory access operations.

On the other hand, storing the entire input data matrix in a contiguous memory space can facilitate access of a large group of input data elements. For example, a single memory access operation can be performed to access a group of input data elements. Moreover, the starting address can have a fixed relationship with the coordinates of the input data elements in the group, which allows the neural network processor to have direct access to the physical addresses of the input data elements without employing an address translation scheme. Such arrangements, however, can lead to waste of memory resources. For example, other applications may be unable to store data in the memory due to lack of other contiguous memory spaces in the memory, while the systolic array typically can only access and process a limited number of input data elements at a time due to other resource constraints.

In some examples of the present disclosure, the neural network processor comprises a memory, a systolic array, a summation buffer, and a controller. The memory can store input data elements of an input data array and weight data elements of a weight data array. Both the input data array and weight data array can be multi-dimensional. For example, the input data array can include one or more two-dimensional input data matrices, with each input data matrix corresponding to an input channel. Moreover, the weight data array can include one or more two-dimensional weight data matrices, with each weight data matrix corresponding to an input channel and an output channel. To perform a convolution operation, the systolic array can obtain weight data elements from the memory and, for each weight data element, obtain a first subset of input data elements from the memory to multiply the each weight data element to obtain first partial sums. The first partial sums can be accumulated at the summation buffer to generate a first output tile of a convolution output data array. The systolic array can obtain the next subset of input data elements from the memory for each weight data element and multiple the next subset with the each weight data element to obtain second partial sums, which can be accumulated at the summation buffer to generate a second output tile of the convolution output array. The systolic array can obtain other subsets to compute other output tiles, and the output tiles can be assembled to form the convolution output data array.

To facilitate access of the input data elements from the memory, the input data elements can be split into chunks, with each chunk occupying at contiguous space in the memory. Each chunk can include one or more regions of input data elements, with each region providing input data elements for generation of an output tile. In some examples, some or all of the chunks can be contiguous. In some examples, the chunks can be scattered around in the memory.

A subset of input data elements can be selected from a chunk for each weight data element. The selection can be based on determining input data elements of the chunk that overlap with a weight data element ("overlapping input data elements") in a convolution operation. The determination of the overlapping input data elements for a weight data element can be performed by a compiler, which can encode the overlapping input data elements information in instructions. The controller can then execute the instructions to perform the selection. The compiler can determine the overlapping input data elements based on a projection operation. The dimensions of the summation buffer (e.g., numbers of columns and rows) can define an output tile represented by a range of coordinates in the output data array. Based on a projection operation, which takes into account the range of coordinates in the output data array and the stride of the convolution operation, the compiler can determine a first region of the input data array comprising input data elements to be convolved with the weight data element. The first region can be defined by a range of target coordinates of input data elements. The first region (and the range of target coordinates) can be shifted by an offset based on the coordinates of the weight data element in the weight data array.

The compiler can identify the subset of input data elements from the shifted first region of the input data array. Specifically, based on the memory locations of the input data elements in the shifted first region (e.g., the chunk/chunks that include the input data elements and the locations of the chunks in the memory), the compiler can determine whether the input data elements in the shifted first region are in a contiguous memory region (e.g., being in the same chunk, or being in chunks that form a contiguous memory region). The compiler can adjust the shifted first region to form a second projected region to include only input data elements in a contiguous region of the memory. The compiler can then align a stride pattern with the second projected region to identify locations of the second projected region that overlap with the stride pattern. The stride pattern defines locations of input data elements that overlaps with the weight data element and reflects the stride of the convolution operation. Based on the overlap, the compiler can determine the subset of the input data elements. The compiler can encode information indicating the subset in a computation instruction for that weight data element. The information may include a start address of the subset of the input data elements, a number of input data elements in the subset, and a number of input data elements skipped between each selected input data element, based on which the controller can fetch the subset of input data elements from the chunk/chunks to the systolic array to multiply with that weight data element.

The memory and the systolic array can support convolution operations of input data and weight data of higher dimensions. For example, as described above, the input data array can include multiple two-dimensional input data matrices of multiple input channels. Moreover, the weight data array can include multiple two-dimensional weight data matrices of multiple input and output channels. The memory can include a plurality of partitions. Each partition can store a part of a chunk (or multiple chunks) of input data elements of an input channel and provide the input data elements to a row of systolic array to compute partial sums of multiple output channels. A chunk of input data elements of multiple input channels can be split among the partitions, and the range of input channels can fold across the partitions in a case where the number of partitions is smaller than the number of input channels, and each partition can store chunks of input data elements of different input channels.

Examples of the present disclosure can facilitate memory access for input data elements for a convolution operation. Specifically, as input data elements for generation of an output tile are stored in a contiguous space, the systolic array can access a subset of input data elements from the contiguous space using fewer operations. For example, as described above, the systolic array can receive a computation instruction that indicates a starting address of the subset of input data elements, as well as a number of input data elements in the subset, and access the chunk (or multiple chunks) based on the instruction to obtain the subset of input data elements to compute an output tile. On the other hand, the chunks can be scattered around the memory to form multiple contiguous memory regions, instead of forming a single contiguous memory region in the memory. Such arrangements can provide a more flexible memory management scheme and allow other applications to store data at the memory, which can improve the utilization of the memory.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects.

Figure 2A:
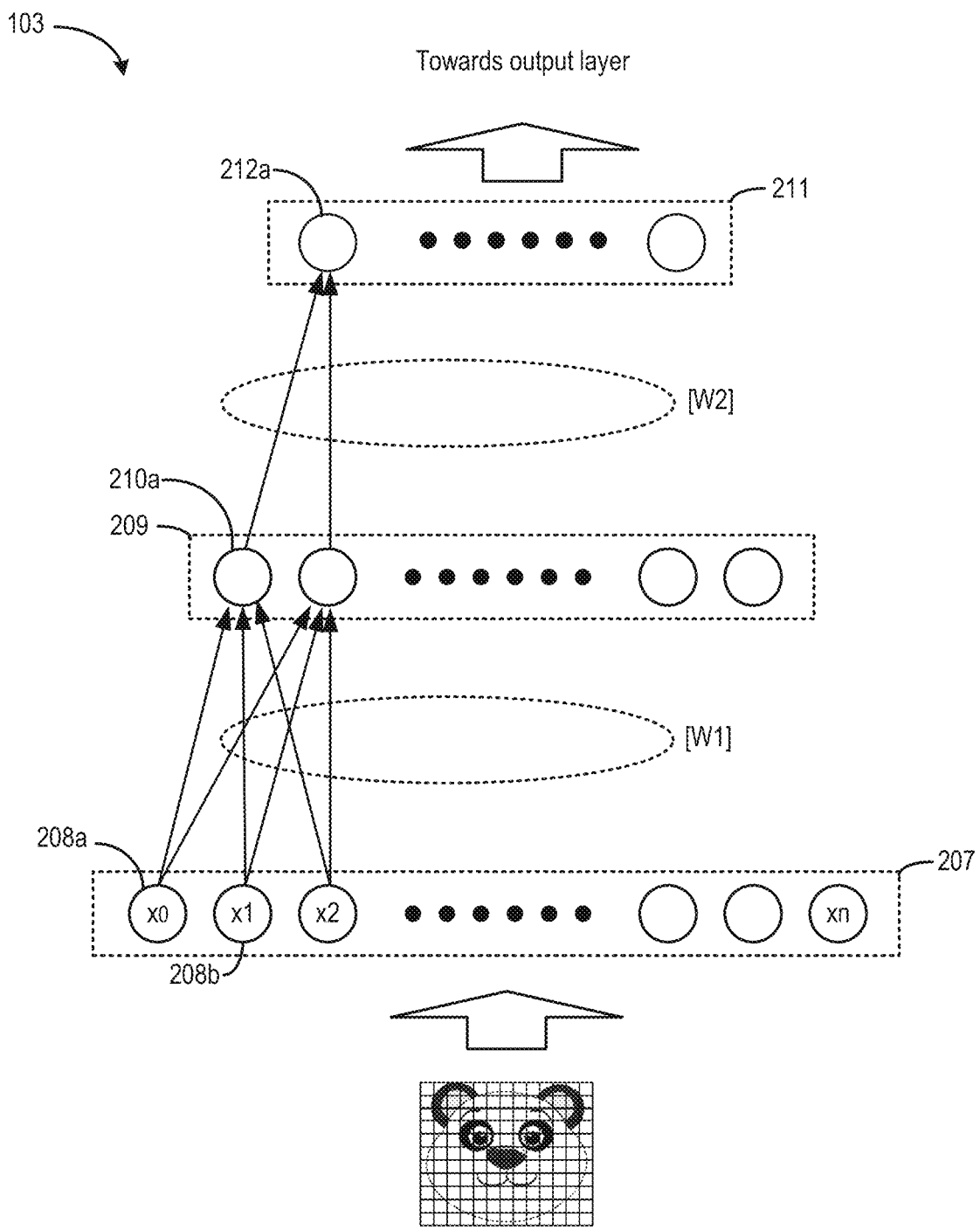
FIGS. 2A-2D are simplified block diagrams illustrating a prediction model and the computations that use techniques disclosed herein, according to certain aspects of the present disclosure.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0$, $x_1$, $x_2$, ... corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \sum_{i=0}^{n}(W1_i \times x_i) \quad \text{(Equation 1)}$$

Here, $\text{sum}_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1). In some examples, a bias can also be added the scaled outputs to generate the intermediate output.

Figure 2B:
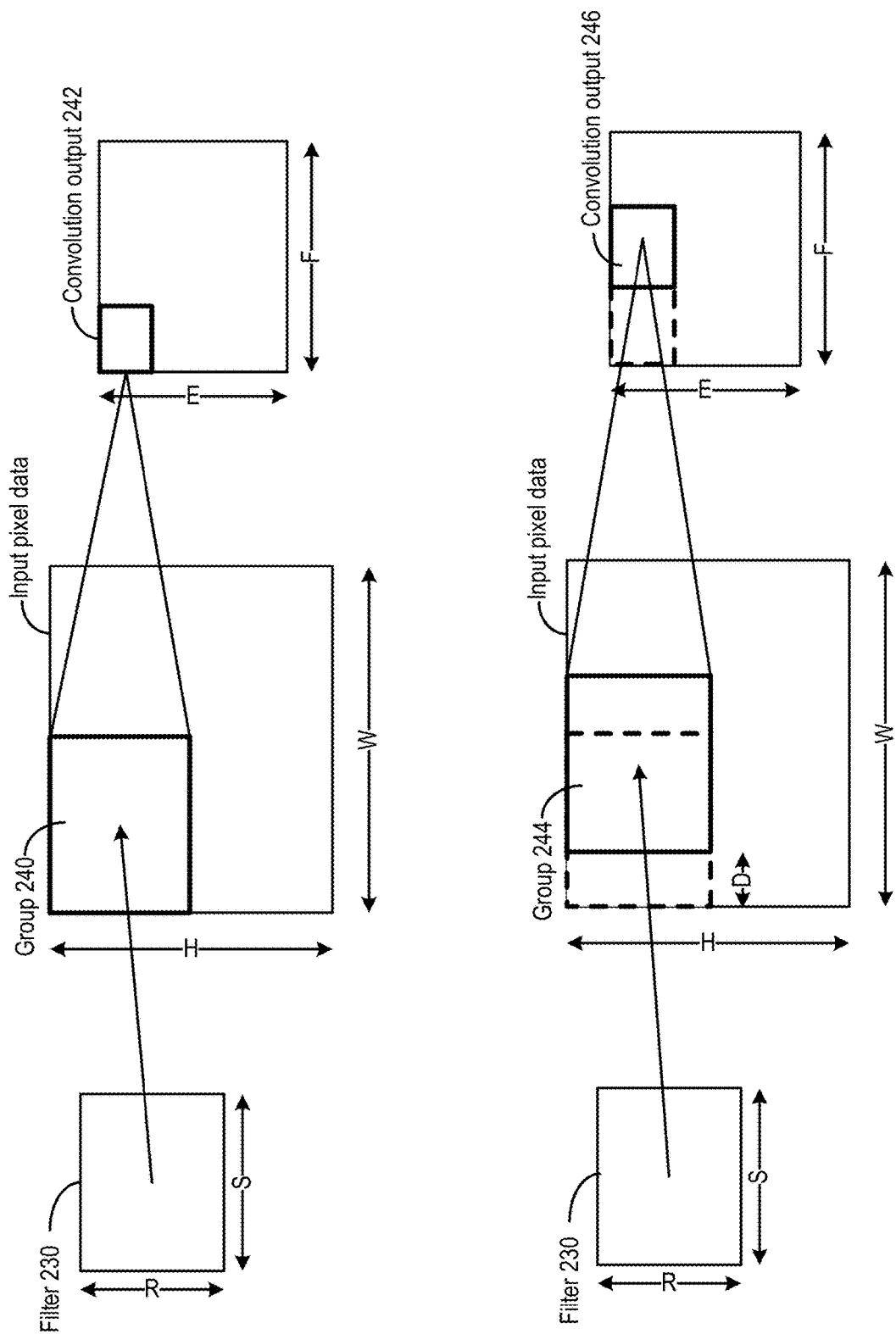

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, which corresponds to a first stride location of filter 230, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image corresponding to a second stride location of filter 230, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

In some examples, the convolution operations can be performed between multiple images and multiple filters. For example, referring to FIG. 2C, a set of C filters 260 may corresponds to a number (C) of images 270, and convolution operations can be performed between each filter of the set of filters 260 and blocks of pixels on the corresponding image of images 270. Each of images 270 can corresponds to an input channel. The convolution results for each filter-image pair can be summed to generate a convolution output as follows:

$$O_{e,f} = \sum_{r=0}^{R-1}\sum_{s=0}^{S-1}\sum_{c=0}^{C-1} X^c_{eD+r,fD+s} \times W^c_{r,s} \quad \text{(Equation 2)}$$

Here, the convolution operation involves the images (or pixel arrays). $X^C_{eD+r,fD+s}$ may refer to the value of a pixel at an image of index c, within the number (C) of images 270, with a row coordinate of eD+r and a column coordinate of fD+s. For the rest of the disclosure, the coordinates of element $X^C_{eD+r,fD+s}$ can be represented in the form of (eD+r, fD+s). The index c can denote a particular input channel. D is the sliding-window stride distance, whereas e and f correspond to the location of the data element in the convolution output array, which can also correspond to a particular sliding window. Further, r and s correspond to a particular location within the sliding window. A pixel at an (r, s) location and of an image of index c can also correspond to a weight $W^c_{r,s}$ in a corresponding filter of the same index c at the same (r, s) location. Equation 2 indicates that to compute a convolution output $O_{e,f}$, each pixel within a sliding window (indexed by (e,f)) may be multiplied with a corresponding weight $W^c_{r,s}$. A partial sum of the multiplication products within each sliding window for each of the image within the image set can be computed. And then a sum of the partial sums for all images of the image set can be computed.

Moreover, in some examples, multiple sets of filters can be used to perform convolution operations with a set of images to generate a set of convolution output arrays, with each convolution output array corresponding to a set of filters. Each set of filters can correspond to an output channel. For example, the multiple sets of filters may correspond to multiple features to be detected from the set of images, and each convolution output array may correspond to the detection results for each feature from the set of images. For example, where M sets of filters are applied to C images to generate M convolution output arrays, Equation 2 can be updated as follows:

$$O_{e,f}^m = \sum_{r=0}^{R-1}\sum_{s=0}^{S-1}\sum_{c=0}^{C-1} X^c_{eD+r,fD+s} \times W^{c,m}_{r,s} \quad \text{(Equation 3)}$$

Here, convolution output $O_{e,f}^m$ and weight $W^{c,m}_{r,s}$ has an index m corresponding to one of the M sets of filters. The index m can denote a particular output channel.

Figure 2C:
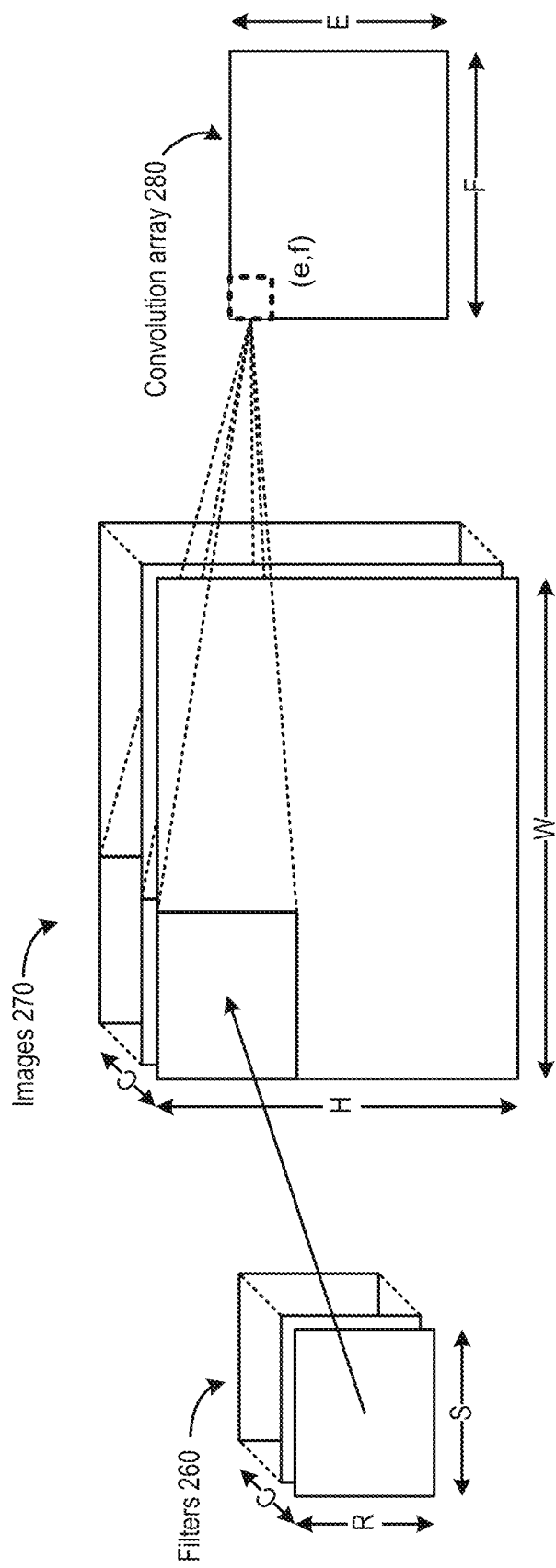
Figure 2D:
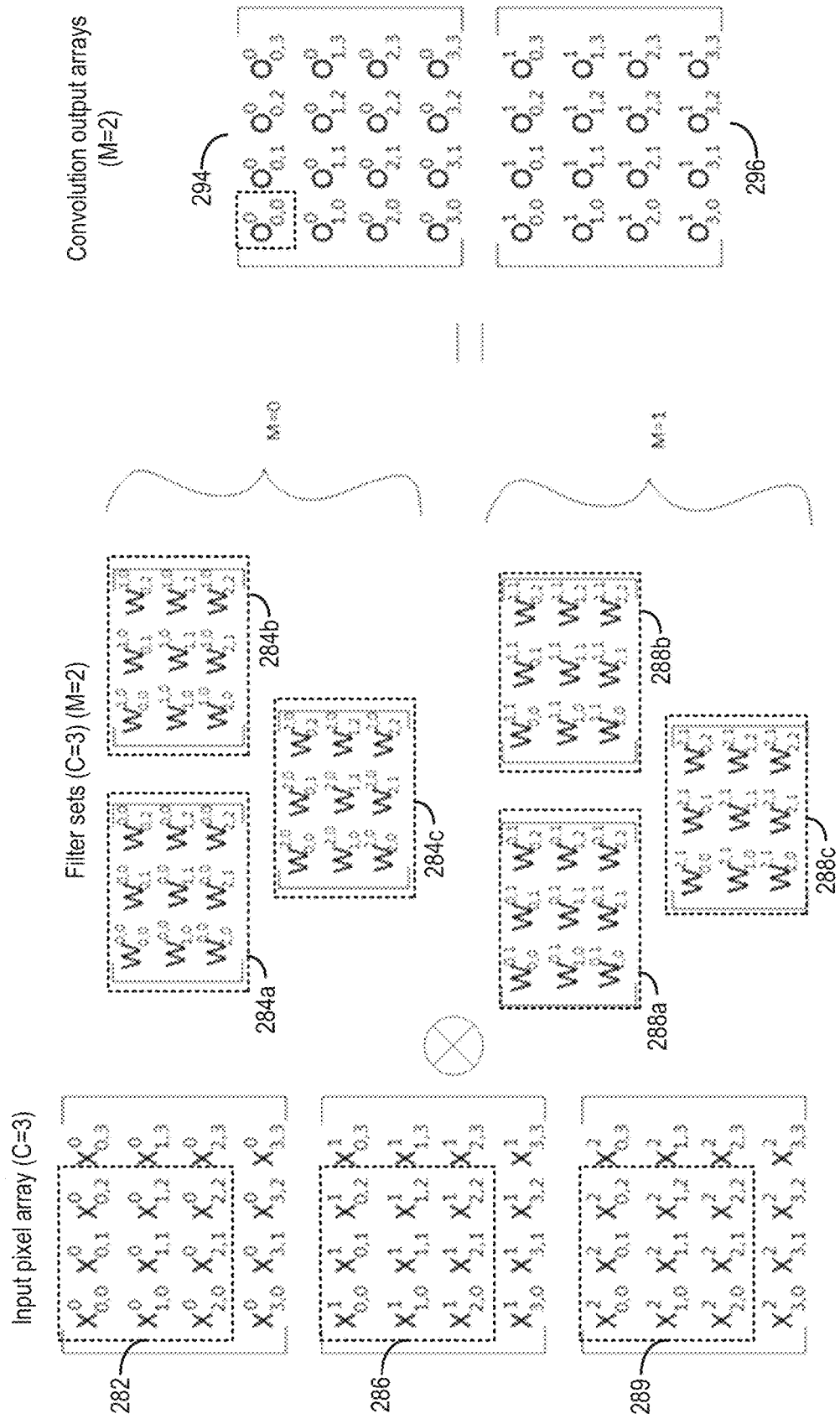

FIG. 2D illustrates an example of C sets of input data sets (with C=3) to be convolved with M sets of filters (with M=2). Each set of input data corresponds to the entries of a pixel array. Each of the M sets of filters includes a set of C filters which correspond to the C sets of input pixel arrays. The convolution operations generate M sets of output data elements, with each set of output data elements corresponding to a convolution output array. Each convolution output array corresponds to convolving one set (of the M sets) of filters with the input pixel arrays. For example, $O_{0,0}^0$ can be generated by a sum of the dot-product between group of pixels 282 and filter array 284, the dot-product between group of pixels 286 and filter array 288, and the dot-product between group of pixels 289 and filter array 292.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x \text{ for } x \geq 0 \\ 0 \text{ for } x < 0 \end{cases} \quad \text{(Equation 4)}$$

In addition to ReLU, other forms of activation function can also be used including, for example, a softplus function (which can be a smooth approximation of a ReLU function), a hyperbolic tangent function (tanh), an arc tangent function (arctan), a sigmoid function, a Gaussian function, etc.

A processing node of layer 209 (e.g., processing node 210a) may process the sum with the ReLU function to generate a first output of layer 209 based on the following equation:

$$\text{first\_output}_{210a} = ReLU(\text{Sum}_{210a}) \quad \text{(Equation 5)}$$

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

The convolution operations of FIG. 2B-FIG. 2D typically involve memory operations. For example, the input data arrays and filter arrays are stored in a memory, which can be accessed to fetch the input data and the filter coefficients/weight data to a systolic array of the hardware accelerator to perform the convolution operation. The memory can be an on-chip memory (e.g., a cache of the hardware accelerator), an off-chip memory (e.g., a dynamic random access memory (DRAM)), etc.

Figure 3A:
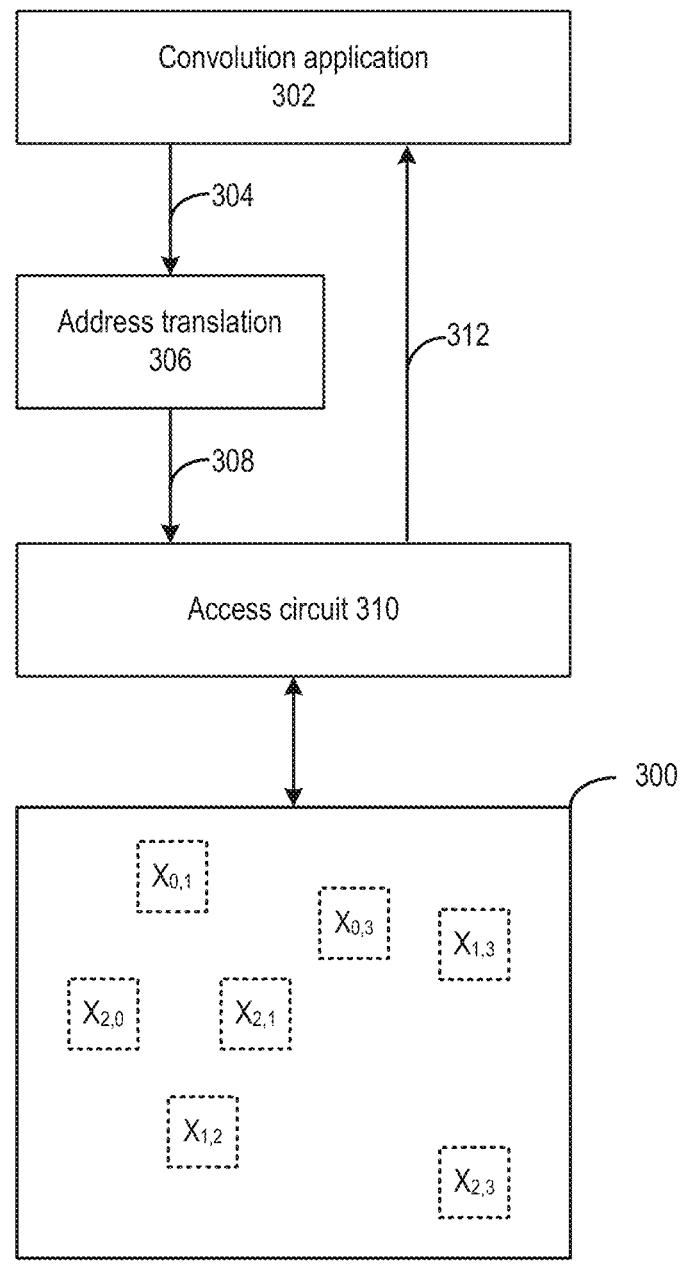
FIGS. 3A-3B illustrate examples of memory operations for a convolution operation.
Figure 3B:
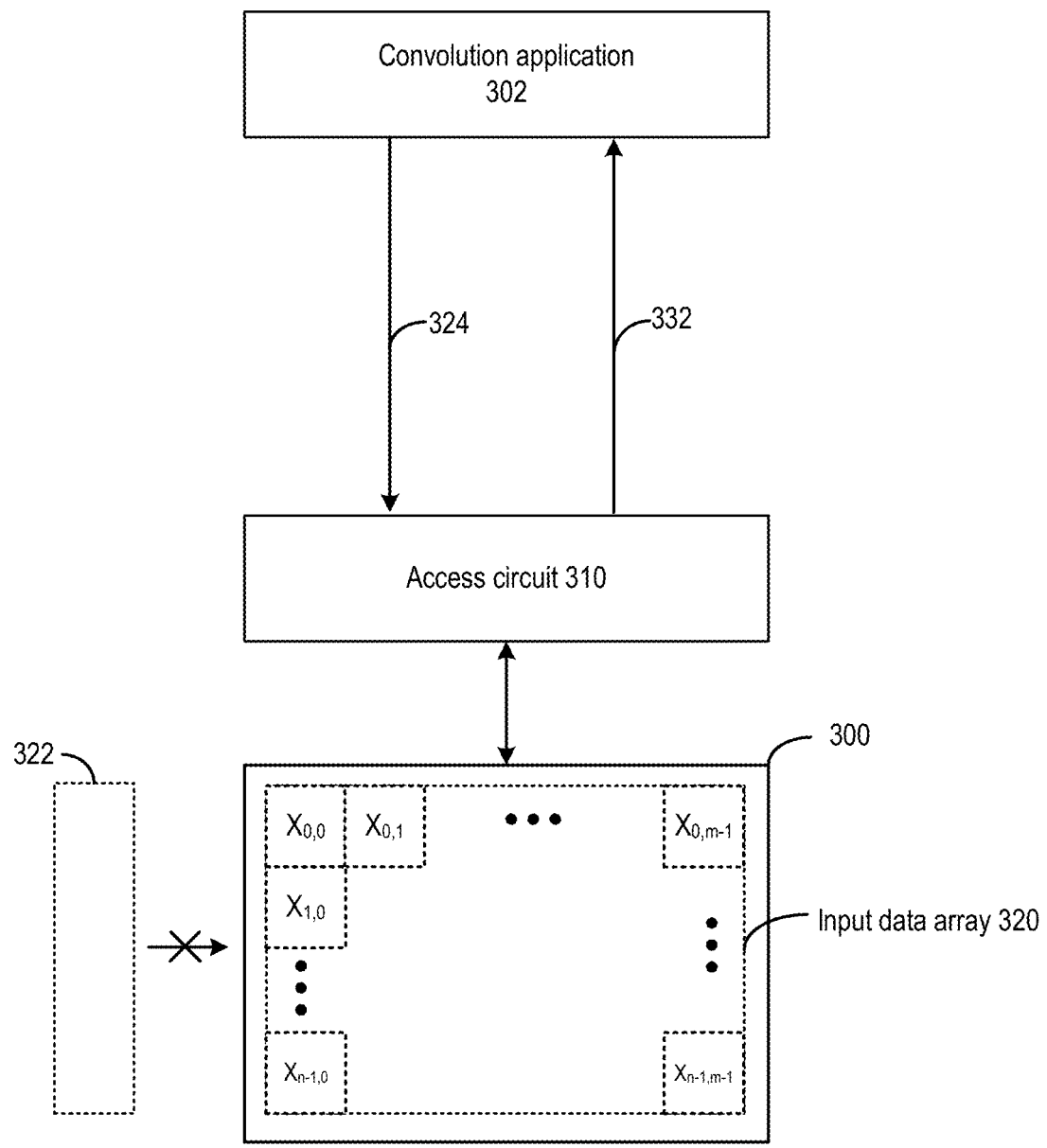

FIG. 3A and FIG. 3B illustrate examples of memory operations for a convolution operation. As shown in FIG. 3A, input data elements of an input data array for a convolution application 302, such as $X_{0,0}$, $X_{0,1}$, $X_{0,3}$, etc., can be stored at random physical addresses within a memory 300. One or more input data elements can be stored at each physical address within the memory based on availability of memory space at that physical address. The physical addresses are typically unknown to the convolution application 302, which may have access to virtual addresses instead. To obtain the input data elements, convolution application 302 can transmit perform a memory read operation for each of the input data elements. As part of the memory read operation, convolution operation 302 can transmit a read request 304 including a virtual address for an input data element to address translation 306, which can translate the virtual address to a physical address and transmit a read request 308 including the translated physical address to an access circuit 310. Access circuit 310 can access memory 300 to obtain the requested input data element from memory 300 and transmit the requested input data element back to convolution application 302 in a response 312.

In the example of FIG. 3A, the speed at which convolution operation 302 obtains the input data elements can be relatively low. Specifically, as the input data elements are scattered around memory 300, a large number memory read operations may be needed to obtain the input data elements from the scattered memory addresses, which add latency to the memory access operations. Moreover, address translation 306 also further increases the latency. As a group of input data elements to multiply with the weight data array in a convolution operation, each convolution operation may require multiple read operations and multiple translation operations, which can add significant latency to the convolution operation especially when convolving a large input data array.

FIG. 3B illustrates another example of memory operations for a convolution operation.

In FIG. 3B, an entire input data array 320 can be stored in a contiguous memory space in memory 300. Each input data element can be stored in adjacent/consecutive address spaces. The address for each input data element can have a fixed relationship with the coordinates of the input data element as well as a number of bits of the input data elements, such as following a row-major order in which consecutive elements of a row of the array are contiguous in memory, a column-major order in which consecutive elements of a column of the array are contiguous in memory, etc. In FIG. 3B, the input data elements can be stored following a row-major order. For example, assuming each input data element has 16 bits, and if input data element $X_{0,0}$ in row 0 is stored at address 0, the next input data element in the row, $X_{0,1}$, can be stored at address 16, followed by $X_{0,2}$ at address 32, etc. Input data element $X_{1,0}$ in row 1 can be at address m, whereas input data element $X_{n-1,m-1}$ can be at address m×n.

Storing the input data elements in a contiguous memory space can facilitate access input data elements for a convolution operation. Compared with the scheme of FIG. 3A, a single memory access operation can be performed to access a group of input data elements. Moreover, the starting address can have a fixed relationship with the coordinates of the input data elements in the group, which allows convolution application 302 to deduce the physical addresses of the input data elements based on their coordinates without employing an address translation scheme. All these can reduce the latency introduced by the memory operations to the convolution operation.

The arrangements of FIG. 3B, however, can lead to waste and under-utilization of the memory resources. For example, another application may seek to store data 322 in a contiguous space in memory 300, but as input data array 320 occupies a large contiguous space in memory 300, there is no contiguous space available for data 322 and data 322 cannot be stored in memory 300, while there is other empty space available in memory 300. Moreover, even if convolution application 302 can issue a single read request to read all the input data elements in memory 300, other resource constraints (e.g., computation resources constraints) may prevent convolution application 302 from performing convolution operation on all of the input data elements from a single request. As convolution application 302 may need to perform a number of memory access operations to complete the convolution operation, the latency reduction brought about by storing input data array 320 in a single contiguous space in memory 300 may also be limited.

Figure 4A:
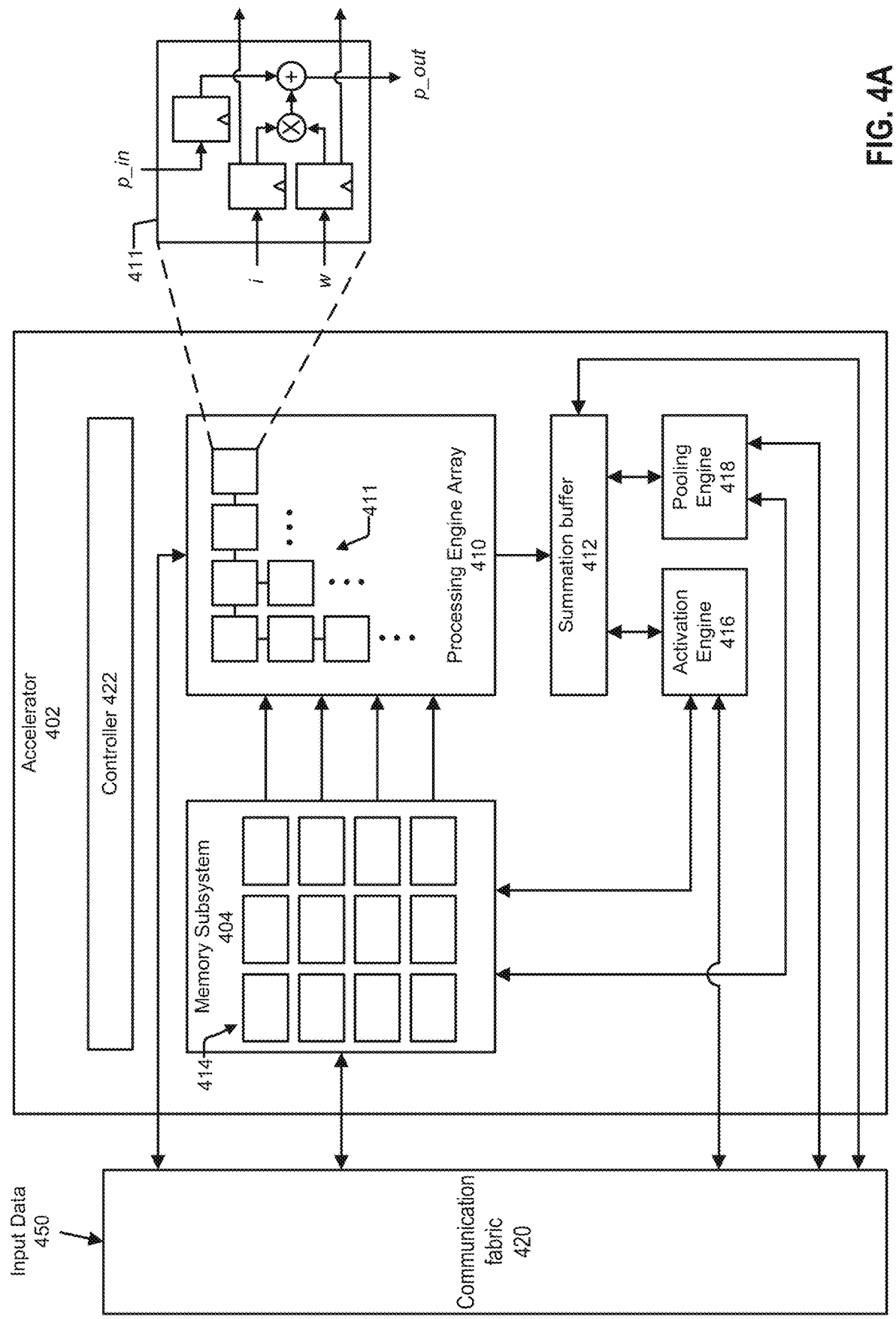
FIGS. 4A-4C illustrate an example neural network processor and its operations, according to certain aspects of the present disclosure.

FIG. 4A is a block diagram illustrating an example of an integrated circuit device that can be configured to perform various types of convolution operations, including normal convolution operations. The example of FIG. 4 illustrates an accelerator 402. In various examples, the accelerator 402, for a set of input data (e.g., input data 450), can execute computations using a processing engine array 410, an activation engine 416, and/or a pooling engine 418. In some examples, the example accelerator 402 may be an integrated circuit component of a processor, such as a neural network processor. The processor may have other integrated circuit components, including additional accelerator engines. Accelerator 402 may include a controller 422 to control the operations of processing engine array 410, activation engine 416, and/or pooling engine 418.

In various implementations, the memory subsystem 404 can include multiple memory banks 414. In these implementations, each memory bank 414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 404 can permit simultaneous access to the read or write channels of multiple memory banks. As another example, the memory subsystem 404 can include arbitration logic such that arbitration between, for example, the outputs of multiple memory banks 414 can result in more than one memory bank's output being used. In these and other examples, though globally managed by the memory subsystem 404, each memory bank can be operated independently of any other.

Having the memory banks 414 be independently accessible can increase the efficiency of the accelerator 402. For example, values can be simultaneously read and provided to each row of the processing engine array 410, so that the entire processing engine array 410 can be in use in one clock cycle. As another example, the memory banks 414 can be read at the same time that results computed by the processing engine array 410 are written to the memory subsystem 404. In contrast, a single memory may be able to service only one read or write at a time. With a single memory, multiple clock cycles can be required, for example, to read input data for each row of the processing engine array 410 before the processing engine array 410 can be started.

In various implementations, the memory subsystem 404 can be configured to simultaneously service multiple clients, including the processing engine array 410, the activation engine 416, the pooling engine 418, and any external clients that access the memory subsystem 404 over a communication fabric 420. In some implementations, being able to service multiple clients can mean that the memory subsystem 404 has at least as many memory banks as there are clients. In some cases, each row of the processing engine array 410 can count as a separate client. In some cases, each column of the processing engine array 410 can output a result, such that each column can count as a separate write client. In some cases, output from the processing engine array 410 can be written into the memory banks 414 that can then subsequently provide input data for the processing engine array 410. As another example, the activation engine 416 and the pooling engine 418 can include multiple execution channels, each of which can be separate memory clients. The memory banks 414 can be implemented, for example, using static random access memory (SRAM).

In various implementations, the memory subsystem 404 can include control logic. The control logic can, for example, keep track of the address spaces of each of the memory banks 414, identify memory banks 414 to read from or write to, and/or move data between the memory banks 414. In some implementations, memory banks 414 can be hardwired to particular clients. For example, a set of memory banks 414 can be hardwired to provide values to the rows of the processing engine array 410, with one memory bank servicing each row. As another example, a set of memory banks can be hard wired to receive values from columns of the processing engine array 410, with one memory bank receiving data for each column.

The processing engine array 410 is the computation matrix of the example accelerator 402. The processing engine array 410 can, for example, execute parallel integration, convolution, correlation, and/or matrix multiplication, among other things. The processing engine array 410 includes multiple processing engines 411, arranged in rows and columns, such that results output by one processing engine 411 can be input directly into another processing engine 411. Processing engines 411 that are not on the outside edges of the processing engine array 410 thus can receive data to operate on from other processing engines 411, rather than from the memory subsystem 404.

In various examples, the processing engine array 410 uses systolic execution, in which data arrives at each processing engine 411 from different directions at regular intervals. In some examples, input data can flow into the processing engine array 410 from the left and weight values can be loaded at the top. In some examples weights and input data can flow from the left and partial sums can flow from top to bottom. In these and other examples, a multiply-and-accumulate operation moves through the processing engine array 410 as a diagonal wave front, with data moving to the right and down across the array. Control signals can be input at the left at the same time as weights, and can flow across and down along with the computation.

In various implementations, the number of columns in the processing engine array 410 determines the computational capacity of the processing engine array 410, and the number of rows determines the required memory bandwidth for achieving maximum utilization of the processing engine array 410. The processing engine array 410 can have, for example, 64 columns and 428 rows, or some other number of columns and rows.

An example of a processing engine 411 is illustrated in FIG. 4 in an inset diagram. As illustrated by this example, a processing engine 411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 411.

In the illustrated example, an input from above can include a partial sum, p_in, provided either from another processing engine 411 or from a previous round of computation by the processing engine array 410. When starting a computation for a new set of input data, the top row of the processing engine array 410 can receive a fixed value for p_in, such as zero. As illustrated by this example, i and w are multiplied together and the result is summed with p_in to produce a new partial sum, p_out, which can be input into another processing engine 411. Various other implementations of the processing engine 411 are possible.

Outputs from the last row in the processing engine array 410 can be temporarily stored in the results buffer 412. The results can be intermediate results, which can be written to the memory banks 414 to be provided to the processing engine array 410 for additional computation. Alternatively, the results can be final results, which, once written to the memory banks 414 can be read from the memory subsystem 404 over the communication fabric 420, to be output by the system.

In some implementations, the accelerator 402 includes an activation engine 416. In these implementations, the activation engine 416 can combine the results from the processing engine array 410 into one or more output activations. For example, for a convolutional neural network, convolutions from multiple channels can be summed to produce an output activation for a single channel. In other examples, accumulating results from one or more columns in the processing engine array 410 may be needed to produce an output activation for a single node in the neural network. In some examples, activation engine 416 can be bypassed.

In various examples, the activation engine 416 can include multiple separate execution channels. In these examples, the execution channels can correspond to the columns of the processing engine array 410, and can perform an operation on the outputs of a column, the result of which can be stored in the memory subsystem 404. In these examples, the activation engine 416 may be able to perform between 1 and n parallel computations, where n is equal to the number of columns in the processing engine array 410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 402 can include a pooling engine 418. Pooling is the combining of outputs of the columns of the processing engine array 410. Combining can include for example, computing a maximum value, a minimum value, an average value, a median value, a summation, a multiplication, or another logical or mathematical combination. In various examples, the pooling engine 418 can include multiple execution channels that can operating on values from corresponding columns of the processing engine array 410. In these examples, the pooling engine 418 may be able to perform between 1 and n parallel computations, where n is equal to the number of columns in the processing engine array 410. In various examples, execution channels of the pooling engine 418 can operate in parallel and/or simultaneously. In some examples, the pooling engine 418 can be bypassed.

Herein, the activation engine 416 and the pooling engine 418 may be referred to collectively as execution engines. The processing engine array 410 is another example of an execution engine. Another example of an execution engine is a Direct Memory Access (DMA) engine, which may be located outside the accelerator 402.

Input data 450 can arrive over the communication fabric 420. The communication fabric 420 can connect the accelerator 402 to other components of a processor, such as a DMA engine that can obtain input data 450 from an Input/Output (I/O) device, a storage drive, or a network interface. The input data 450 can be, for example one-dimensional data, such as a character string or numerical sequence, or two-dimensional data, such as an array of pixel values for an image or frequency and amplitude values over time for an audio signal. In some examples, the input data 450 can be three-dimensional, as may be the case with, for example, the situational information used by a self-driving car or virtual reality data. In some implementations, the memory subsystem 404 can include a separate buffer for the input data 450. In some implementations, the input data 450 can be stored in the memory banks 414 when the accelerator 402 receives the input data 450.

In some examples, the accelerator 402 can implement a neural network processing engine. In these examples, accelerator 402, for a set of input data 450, can execute a neural network to perform a task for which the neural network was trained. Executing a neural network on a set of input data can be referred to as inference or performing inference.

The weights for the neural network can be stored in the memory subsystem 404, along with input data 450 on which the neural network will operate. The addresses of the weights and input data 450 in memory subsystem 404 can be based on or mapped to the coordinates of the weights and input data 450 in, respectively, a weight data array and an input data array, which allows the weight and the input data to be retrieved based on addresses derived from their coordinates. The neural network can also include instructions, which can be executed by controller 422 to control the processing engine array 410 to perform various computations on the weights and the input data. The instructions can be generated by a compiler and can also be stored in the memory subsystem 404, in the memory banks 414 or in a separate instruction buffer. The processing engine array 410 can output intermediate results, which represent the outputs of individual layers of the neural network. In some cases, the activation engine 416 and/or pooling engine 418 may be enabled for computations called for by certain layers of the neural network. The accelerator 402 can store the intermediate results in the memory subsystem 404 for inputting into the processing engine array 410 to compute results for the next layer of the neural network. The processing engine array 410 can further output final results from a last layer of the neural network. The final results can be stored in the memory subsystem 404 and then be copied out to host processor memory or to another location.

Figure 4B:
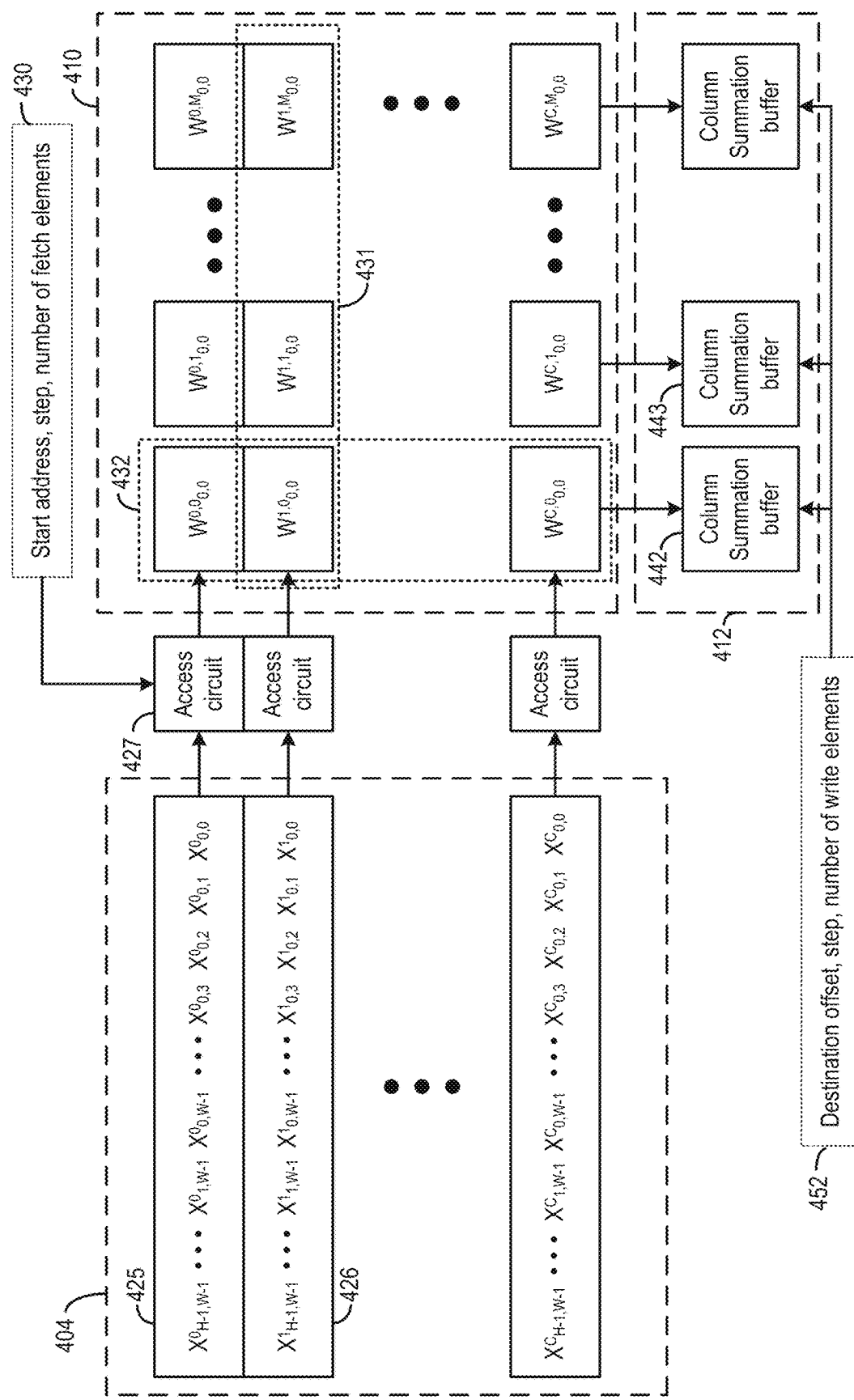
Figure 4C:
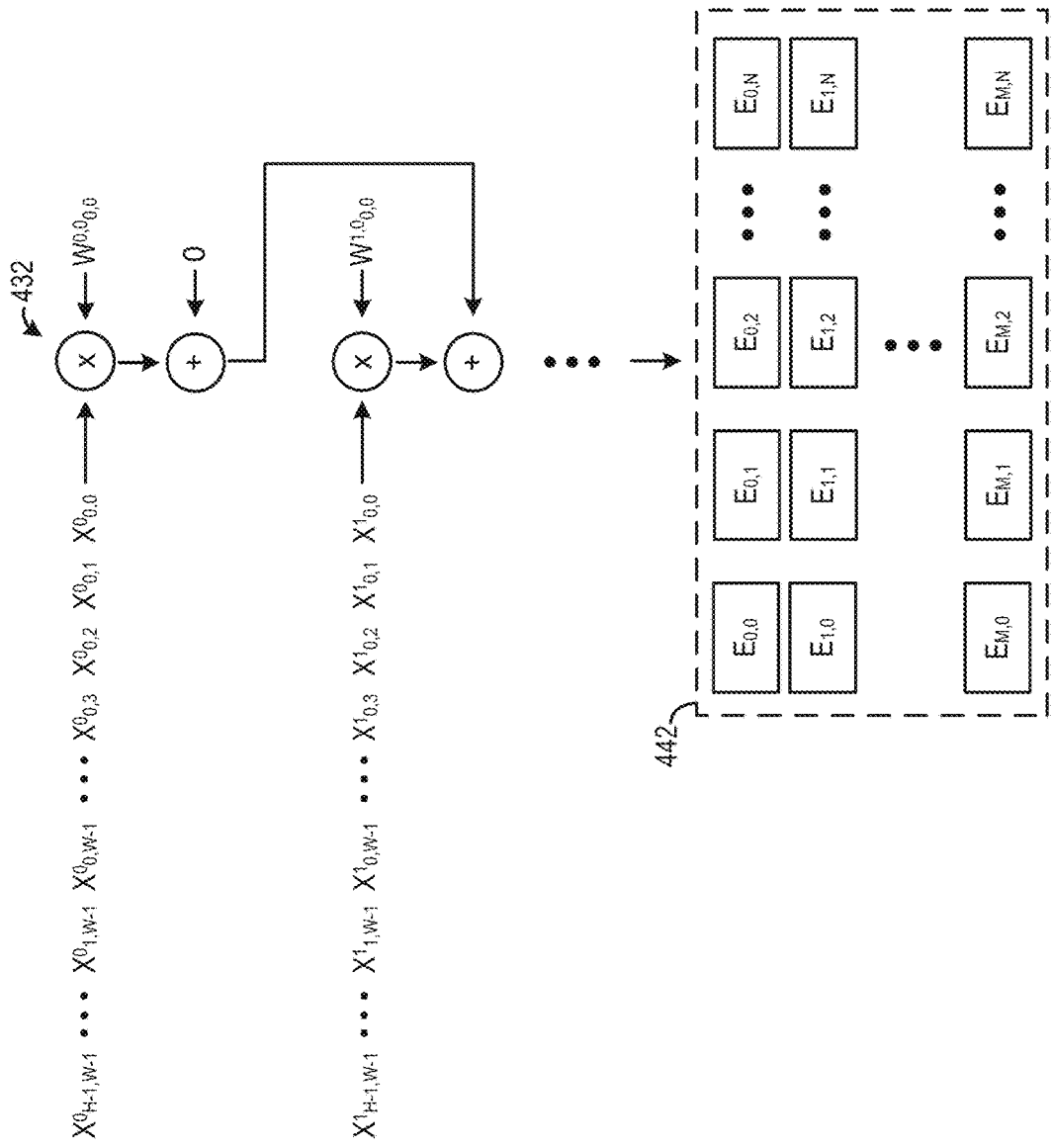

FIG. 4B and FIG. 4C illustrate examples of operations of accelerator 402. As shown in FIG. 4B, memory subsystem 404 can be organized into multiple rows, such as memory rows 425, 426, etc. Each memory row can store the input data elements of a particular input channel. A memory access circuit (e.g., memory access circuit 427) can be controlled to fetch the input data elements to processing engine array 410 sequentially based on a set of memory fetch parameters 430 including a start address, step, and number of elements. The start address parameter can define the location of the first input data element to be read from the memory row, the step parameter can define a number of input data elements skipped between the fetched input data elements, whereas the number of fetch elements parameter can define a total number of input data elements to fetched. As the input data elements are stored in a contiguous space, access circuit 427 can determine the addresses of the input data elements to be fetched and update the counter based on the step. For example, access circuit 427 can start fetching the first input data element from the start address, add an address offset based on the step to the start address to fetch the next input data element while skipping a number of input data elements, and repeat until the number of fetch elements is reached. As to be described in more details below, memory fetch parameters 430 can be included in an instruction to compute a set of partial sums. The instruction can be generated by a compiler and parsed by controller 422 to extract memory fetch parameters 430. Controller 422 can then control the fetching of input data elements from memory subsystem 400 based on the extracted memory fetch parameters 430. As to be described in details below, the start address, step, and number of elements parameters can be configured to support different types of convolution operations, such as a normal convolution operation.

The processing engines 411 of processing engine array 410 can be organized into rows, such as row 431, and columns, such as column 432. Each row of processing engines 411 is mapped to an input channel and can receive input data elements sequentially from a memory row of memory system 404 mapped to the input channel, whereas each column of processing engines 411 can be mapped to an output channel. Input data elements are stored in a contiguous address space and following an order based on their coordinates in the input data array. Each processing engine 411 can store a weight data element for an input channel and an output channel the processing engine is mapped to. Each column of processing engines 411. Referring to FIG. 4A and FIG. 4B, a processing engine 411 within an engine can receive input data elements of an input channel (e.g., input data i of FIG. 4A), multiply it with the stored weight (e.g., weight data w of FIG. 4A) to generate a product, add the product to the input partial sump in to generate the new partial sum p_out, and pass the new partial sum pout to the processing engine 411 below of the same column. The bottom processing engine 411 of a column can generate a partial sum representing a sum of products between the weight data elements stored in the column of processing engines 411 and the input data elements of different input channels received from memory substation 404.

In a case where memory fetch parameters 430 indicate that the starting address is at the rightmost input data element of each row, a step of one (which can indicate skipping in this example), and a certain number of input data elements are to be fetched, in a first iteration column 432 of processing engines 411 can generate a first partial sum based on the stored weight data elements and input data elements provided by memory subsystem 404 as follows:

$$\text{First partial sum} = X^0_{0,0} \times W^{0,0}_{0,0} + X^0_{0,0} \times W^{1,0}_{0,0} + \ldots + X^C_{0,0} \times W^{C,0}_{0,0} \quad \text{(Equation 6)}$$

In a second iteration, column 432 of processing engines 411 can generate a second partial sum based on the stored weight data elements and input data elements provided by memory subsystem 404 as follows:

$$\text{Second partial sum} = X^0_{0,1} \times W^{0,0}_{0,0} + X^0_{0,1} \times W^{1,0}_{0,0} + \ldots + X^C_{0,1} \times W^{C,0}_{0,0} \quad \text{(Equation 7)}$$

Each column of processing engines 411 can provide the partial sums generated in the iterations to a column summation buffer, such as column summation buffers 442, 443, etc., both of which are part of summation buffer 412. The partial sums are generated based on weight data elements at the same coordinates of different filter arrays associated with different input and output channels, and the partial sums correspond to different output data elements. Referring to FIG. 4C, each of column summation buffers 442 and 443 includes a number of entries, such as $E_{0,0}$, $E_{0,1}$, $E_{0,2}$, etc. Each entry can have coordinates mapped to coordinates of an output tile, which can represent a region of an output array. Each entry has an adder (not shown in FIG. 4C) which allows the entry to add a received partial sum to the stored partial sum to generate an accumulated partial sum. The entry can then store the accumulated partial sum.

The operations at column summation buffers 442 and 443 can be controlled by a set of buffer write parameters 452 including a destination offset, a step, and a number of write elements. The destination offset parameter can indicate the entry to which the first partial sum (of the first iteration) is to be added to. The step parameter can indicate a number of entries to be skipped between neighboring entries that receive partial sums. The step parameter can correspond to a gap between non-zero input data elements that overlap with a weight data element when the weight data array is at different stride locations. Moreover, the number of write elements indicate a number of partial sums to be added to entries of the summation buffer starting from the start address, with neighboring entries separated based on the step parameter as described above.

As an illustrative example, in a case where the destination offset is 2 and the step is 1, the first partial sum from column 432 can be stored at entry $E_{0,2}$, the second partial sum can be stored at $E_{0,3}$, the third partial sum can be stored at $E_{0,4}$, etc., until a number of partial sums specified by the number of write elements is stored. As to be described in more details below, buffer write parameters 452 can be included in the instruction to compute the set of partial sums. The instruction can be parsed by controller 422 to extract buffer write parameters 452. Controller 422 can then control the operations of the summation buffers based on the extracted buffer write parameters 452. As to be described below, buffer write parameters 452 can be configured to support convolution operations.

After computing the partial sums from a first set of weight data elements (same coordinates in their respective filter arrays but of different input and output channels), processing engine array 410 can load a new set of weight data elements from different coordinates and repeat the partial sums computations. The new partial sums can be added to the partial sums stored in summation buffer 412 computed from the first set of weight data elements. The computations and accumulations of the partial sums can continue for the rest of the weight data elements to generate the data elements of the output tile. After the data elements of the output tile are generated, summation buffer 412 can provide the data elements of the output tile to activation engine 416 and/or pooling engine 418 for post-processing, and the post-processed output data elements can be stored in memory subsystem 404. From memory subsystem 404, the post-processed output data can be sent to communication fabric 420 and/or fetched to processing engine array 410 as input data for a subsequent neural network layer processing.

Figure 5A:
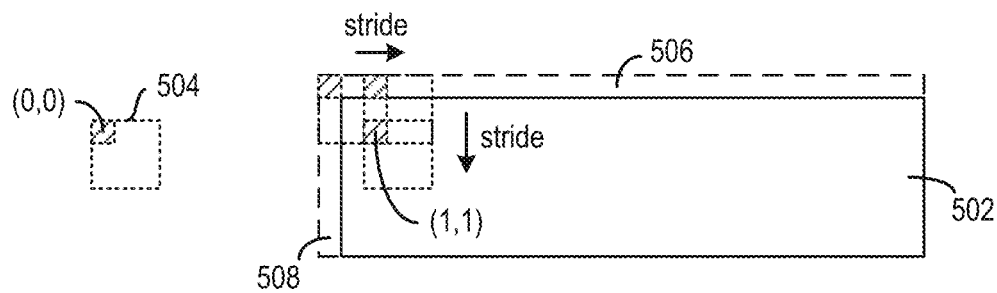
Figure 5A:
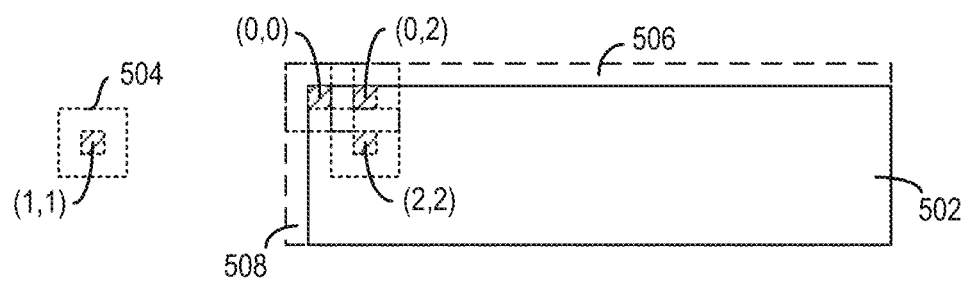
Figure 5A:
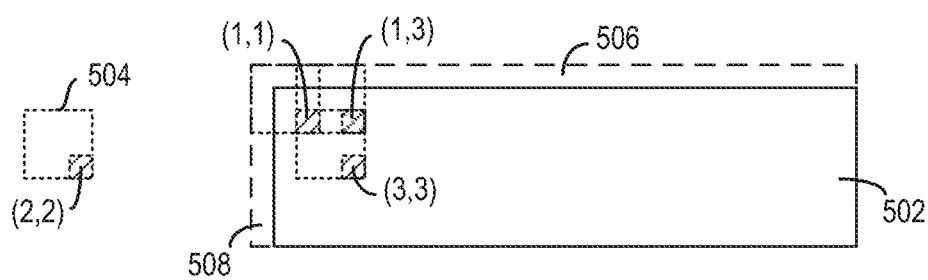

FIG. 5A-FIG. 5D illustrate example configurations of accelerator 402 to perform a normal convolution operation. FIG. 5A illustrates the overlapping between different weight data elements of a 3×3 filter array 504 and the input data elements of an input data array 502. In FIG. 5A, input data array 502 can be padded with a row 506 of zeros on the top and a column 508 of zeros on the left. The number of rows of padding zero can be specified by a pad north parameter, with pad north equals one indicating that one row of zeros is padded on the top of input data array 502. Moreover, the number of columns of padding zero can be specified by a pad_west parameter, with pad_west equals one indicating that one column of zeros is padded on the left of input data array 502. The normal convolution operation can be between the zero-padded input data array 502 and filter array 504, with a stride of 2. Some of input data elements/padding zeros that overlap with a particular weight data element at different stride locations are shaded. As shown in FIG. 5A, some of the padding zeros, as well as input data element at coordinates (1, 1), can overlap with the weight data element (0, 0) at different stride locations. Moreover, input data elements (0, 0), (0, 2), and (2, 2) can overlap with weight data element (1, 1) at different stride locations. Further, input data elements (1, 1), (1, 3), and (3, 3) can overlap with weight data element (2, 2) at different stride locations. In each cases, there is a gap between each input data elements that overlap with the weight data element. The gap can be defined based on the stride distance of the convolution operation. With a stride distance of two, the gap comprises one input data element.

Referring back to FIG. 4B and FIG. 4C, to perform the normal convolution operation of FIG. 5A, controller 422 can be provided with memory fetch parameters 430 which defines a set of overlapping non-zero input data elements for a weight data element that is loaded into a processing engine 411. The set of overlapping non-zero input data elements can be defined based on start address, step, as well as number of fetch elements parameters. The start address can be the address of the first overlapping non-zero input data elements in memory subsystem 404. The address can be determined based on a mapping between memory subsystem 404 addresses and the coordinates of the input data elements stored in memory subsystem 404. Moreover, the step can correspond the gap described above and can be based on the stride distance. Further, the number of fetch elements can be based on the dimensions of the output tile for the convolution operation, which in turn can be based on the dimensions of the summation buffer, as to be described below. Based on memory fetch parameters 430 for each weight data element, controller 422 can fetch the correct subset of input data elements to processing engine array 410 to multiply with that weight data element to generate partial sums.

Moreover, controller 422 can be provided with buffer write parameters 452 to store non-zero partial sums for different stride locations at entries of a column summation buffer (e.g., column summation buffer 442) corresponding to the stride locations. For example, referring back to FIG. 4C, the partial sum for a stride location (0, 0) can be accumulated at entry $E_{0,0}$, the partial sum for a stride location (0, 1) can be accumulated at entry $E_{0,1}$, etc. The destination offset of buffer write parameters 452 can also be based on the set of overlapping non-zero input data elements for a weight data element. Specifically, the starting offset can be provided to the column summation buffer to skip a number of entries corresponding to zero partial sums, which corresponds to a number of padding zeros that overlap with the weight data element, until the entry that corresponds to the stride location where the weight data element overlaps with an input data element. Referring to the example of FIG. 5A, weight data element (0, 0) overlaps with the padding zeros at the first few stride locations until overlapping with input data element at (1, 1). The destination offset of buffer write parameters 452 can be configured to ensure that the partial sum generated from input data element at (1, 1) is stored at an entry that reflects the stride location of filter array 504 when weight data element (0, 0) overlaps with input data element (1, 1).

Figure 5B:
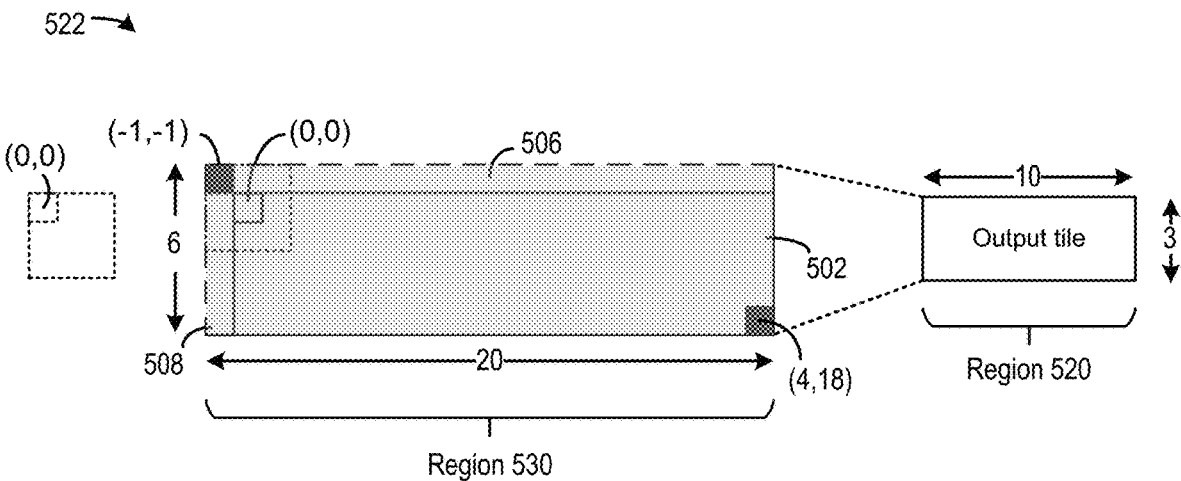
Figure 5B:
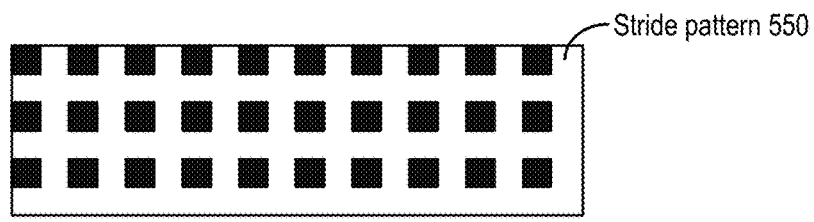
Figure 5B:
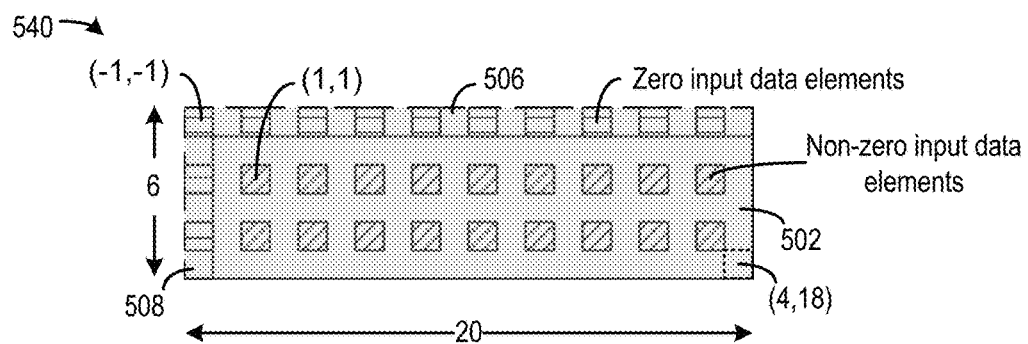

FIG. 5B illustrates example operations to determine the overlapping input data elements for a particular weight data element, which can be performed by a compiler. Referring to FIG. 5B, based on the dimensions of a column summation buffer (e.g., number of rows and columns of entries), the compiler can determine the dimension of an output tile as well as the total number of entries of the column summation buffer. As described above, the output tile comprises output data elements of a region 520 in the output data array, and the output tile can be defined by a range of coordinates of the first region in the output data array.

In operation 522, the compiler can perform a projection operation from region 520 represented by the output tile to determine a region 530 in input data array 502 that can provide the input data elements to be convolved with a weight data element to generate the output tile. The projection operation can take into account the dimensions of the first region as well as the stride distance of the convolution operation. As described above, the stride distance can define the gap between each overlapping input data elements, with a stride distance of two leading a gap of an input data element. The dimension of region 530 can be determined based on the dimension of region 520 and the gap. For example, referring to FIG. 5B, based on the output tile having 10 output data elements per row and three rows (a total 30 entries), the dimensions of region 530 can be determined by scaling the dimension of region 520 by two, such that region 520 has 20 input data elements per row and six rows. With such arrangement, as one input data element is skipped between two input data elements, the total number of input data elements (and the resulting partial sums) can be equal to the total number of output data elements in the output tile, as well as the number of entries of the column summation buffer.

After determining the dimensions of region 520, the compiler can align region 530 with the padded input data array 502. The alignment can be based on the coordinates of the weight data element as well as the pad north and pad_west parameters. The coordinates of the upper-left corner of region 530, with respect to the original input data array 502, can be based on the follow equations:

$$\text{Start\_coordinates} = (\text{weight\_r} - \text{pad\_west}, \text{weight\_s} - \text{pad\_north}) \quad \text{(Equation 8)}$$

In Equation 8, start coordinates refer to the coordinates of the upper-left corner of region 530, weight r refers to the row coordinates of the weight data element, weights refers to the column coordinates of the weight data element, pad_west refers to the number of columns of zeros added to the left of input data array 502, whereas pad_north refers to the number of rows of zeros added to the top of input data array 502.

As shown in FIG. 5A, for weight data element (0, 0), the upper-left corner of region 530 can align with the upper-left corner of zero-padded input data array 502. With such alignment, weight data element (0, 0), with filter array 504 at stride location (0, 0), overlaps the upper-leftmost element of region 530, which represents the first input data element to be multiplied with the weight data element and is at coordinates (−1, −1) with respect to the original input data array 502. From the alignment operation, the compiler can determine a range of target coordinates of region 520 with respect to the original input data array 502. In FIG. 5B, the range of target coordinates of region 530 can be from (−1, −1) and (4, 18) with respect to the upper-left corner of the original input data array 502, which has the coordinates (0, 0). The location of the upper-leftmost element of region 530 can be a reference location and can be based on the location of the output tile in the output data array. For example, for a second output tile immediately below region 520, the reference location can be offset from (−1, −1) by the height of region 530 and can be at (5, −1).

In operation 540, after determining the target coordinates of region 530, the compiler can superimpose a stride pattern 550 over region 530. Stride pattern 550 can define the gap between overlapping input data elements based on the stride distance. Each dark box in stride pattern 550 can represent an overlapping input data element. As described above, with a stride distance of two, the gap includes an input data element. When superimposing stride pattern 550 over region 530, the upper-left corner of stride pattern 550 aligns with the upper-left corner of region 530. Based on the alignment and the gap in stride pattern 550, the compiler can compute the coordinates of stride pattern 550 with respect to the original input data array 502 based on the coordinates of the upper-leftmost element of region 530 (−1, −1), as well as the gap information. For example, a first element of the stride pattern overlaps with the upper-leftmost element of region 530 and has coordinates (−1, −1), a second element of the stride pattern on the same row as the first element has a gap of 1 from the first element and can have coordinates (−1, 1), etc. Based on the coordinates of the stride pattern, as well as dimensions of the original input data array 502 which can define a range of coordinates of the input data elements included in the original input data array 502, the compiler can identify a first subset of the coordinates that are within the zero-padding region and a second subset of the coordinates that are within original input data array 502. The first subset of the coordinates are in the zero-padding region and can represent zero input data elements that lead to zero partial sums (since multiplication of zero), whereas the second subset of the coordinates can represent non-zero input data elements that lead to non-zero partial sums. The non-zero input data elements represented by the second subset of the coordinates can be the overlapping input data elements with the weight data element (0, 0) in the original input data array 502.

The compiler can determine start address, step, number of fetch elements parameters of memory fetch parameters 430 based on the first subset of the coordinates in the zero-padding region and the second subset of the coordinates in the original input data array 502. Specifically, the start address parameter of memory fetch parameters 430 can correspond to the first coordinates in the second subset of coordinates. In the example of FIG. 5B, the start address can correspond to coordinates (1, 1) of the input data array 502, which can be translated to an address in memory subsystem 404. Moreover, the step is based on the stride distance as described above. The number of fetch elements parameter can be based on the size of the second subset of the coordinates. In the example of FIG. 5B, the size of the second subset of the coordinates can be 18, since there are 18 non-zero input data elements in the original input data array 502 that can overlap with weight data element (0, 0). Therefore, the number of fetch elements parameter can be set to 18 as well.

The compiler can also determine the destination offset, step, and number of write elements parameters of buffer write parameters 452 based on the first subset of the coordinates in the zero-padding region and the second subset of the coordinates in the original input data array 502. Specifically, based on the first subset of the coordinates, the compiler can determine that the first 11 input data elements are zero, which means the first 11 entries of the column summation buffer needs to be skipped, and the destination offset parameter can be set to 11. Moreover, as 18 input data elements are to be fetched, 18 partial sums will be generated, and the number of write elements parameter can be set to 18. Moreover, the non-zero input data elements that overlap with the weight data element are separated by the stride, which means there is no gap between the overlapping non-zero input data elements when the weight data array is at various stride locations in the input data array. Therefore the step parameter of buffer write parameters 452 can be set to one. To maintain a rectangular shape, the 18 partial sums can be stored in a 9×2 region (which can based on a number of input data elements in a row) in the column summation buffer shifted to the right with the first column of entries skipped.

Referring back to operation 522 and Equation 8, the compiler can adjust the alignment of region 530 with respect to the padded input data array 502 based on the coordinates of the weight data element by adding an offset along both the row and column dimension. For example, referring to FIG. 5C, for weight data element (1, 1), the compiler can compute the coordinates of the upper-left corner of region 530 using Equation 8 and obtain (0, 0). That is, compared with weight data element (0, 0), region 530 is shifted towards right and bottom by one unit from the upper-left corner of the padded input data array 502 and with respect to reference location (−1, −1). The coordinates of the upper-left corner of region 530 can become (0, 0), and the range of coordinates of region 530 can become (0, 0) to (5, 19). With such alignment, the upper-leftmost element of region 530, which represents the first input data element to be multiplied with weight data element (1, 1), overlaps with the weight data element when filter array 504 is at stride location (0, 0). For weight data element (1, 1), region 530, as well as stride pattern 550, overlaps with the original input data array 502 but not the zero padding. The first input data element starts at coordinates (0, 0), and a total of 30 input data elements can be fetched. Moreover, since there is no zero input data elements, there is no skipping of entries of the column summation buffer.

Moreover, for weight data element (2, 2), the compiler can compute the coordinates of the upper-left corner of region 530 using Equation 8 and obtain (1, 1). That is, the compiler can shift region 530 towards right and bottom by two units from the upper-left corner of the padded input data array 502 (reference location (−1, −1). The range of coordinates of region 530 becomes (1, 1) to (6, 20). With such alignment, the upper-leftmost element of region 530, which represents the first input data element to be multiplied with weight data element (2, 2), overlaps with the weight data element when filter array 504 is at stride location (0, 0). For weight data element (2, 2), region 530, as well as stride pattern 550, overlaps with the original input data array 502 but not the zero padding. The first input data element starts at coordinates (1, 1), and a total of 27 input data elements can be fetched. Moreover, since there is no zero input data elements, there is also no skipping of entries of the column summation buffer. To maintain a rectangular shape, the 27 partial sums can be stored in a 9×3 region (which can based on a number of input data elements in a row) in the column summation buffer shifted to the left with the last column of entries skipped.

Figure 5C:
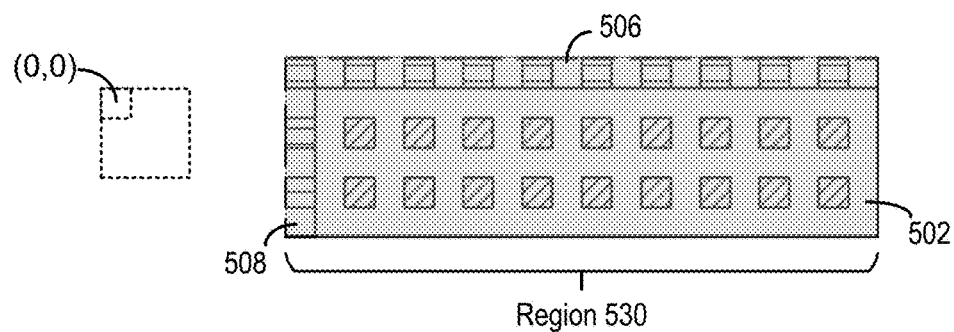
Figure 5C:
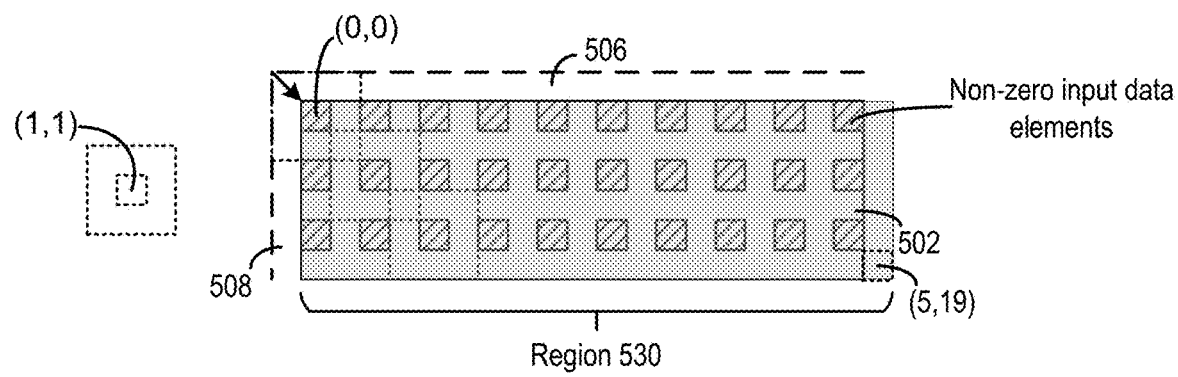
Figure 5C:
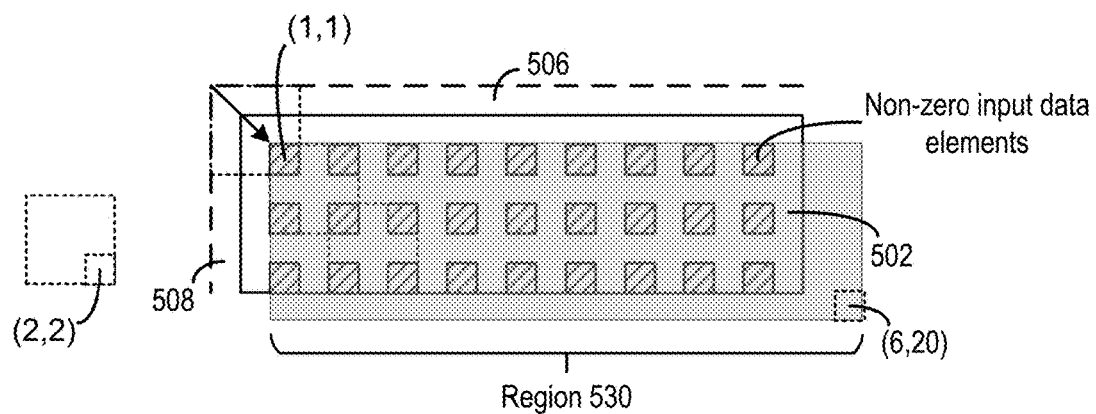

FIG. 5D illustrates examples of memory fetch parameters 430 and buffer write parameters 452 for weight data elements (0, 0), (1, 1), and (2, 2) for the convolution operations shown in FIG. 5A-FIG. 5C, as described above.

Figure 6A:
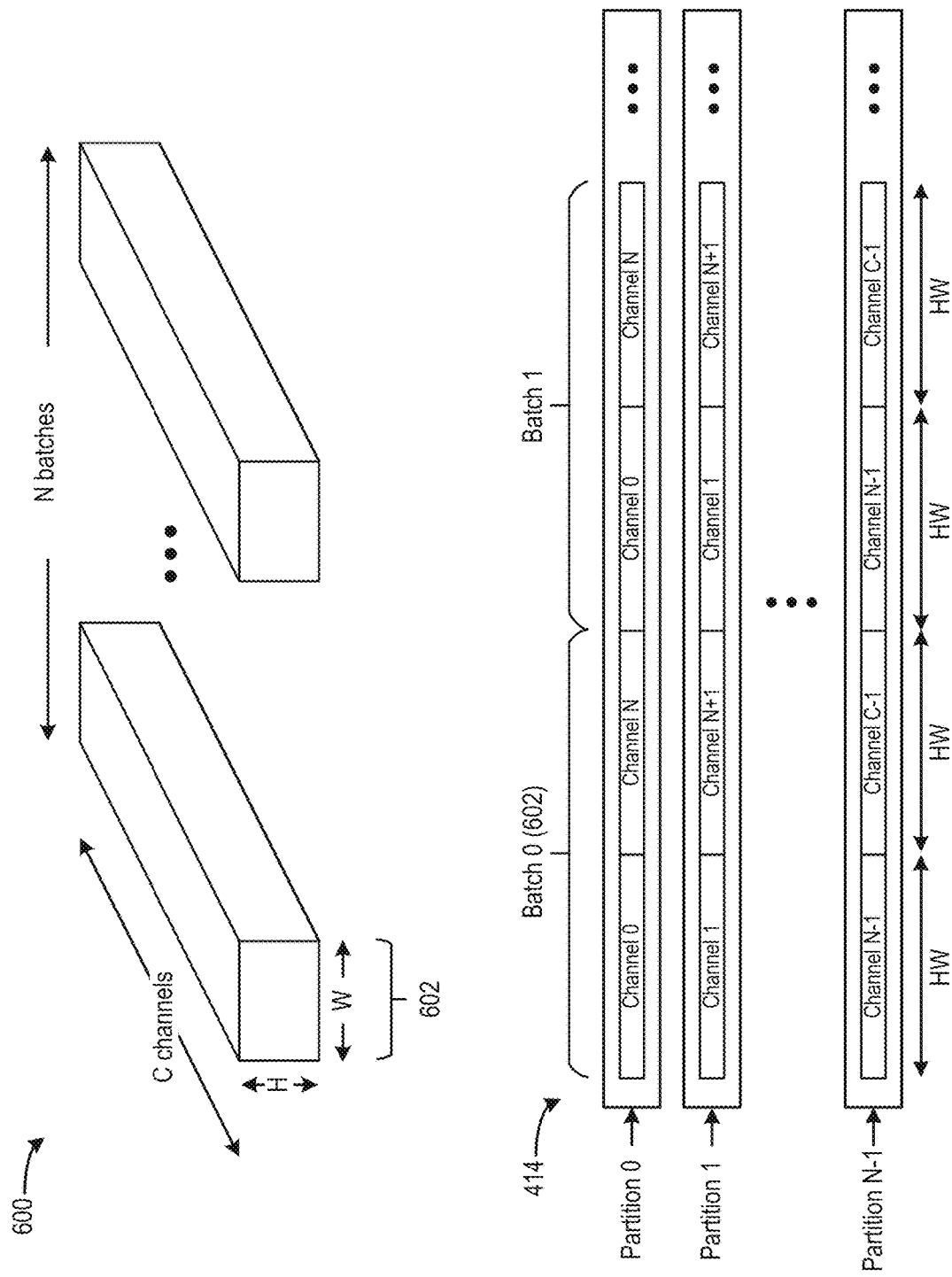
FIGS. 6A-6F illustrate example memory operations at the example neural network processor of FIGS. 4A-4C for a convolution operation, according to certain aspects of the present disclosure.

FIG. 6A-FIG. 6F illustrate example memory operations involved in the convolution operations of FIG. 5A-FIG. 5D for a multi-dimensional input data array. FIG. 6A illustrates a multi-dimensional input data array 600 and how the data array is stored in memory subsystem 400. As shown in FIG. 6A, input data array 600 can include sets of multi-channel two-dimensional input data array 602 having a height of H and a width of W for C input channels. Each multi-channel two-dimensional input data array/matrices can correspond to a batch of input data to be processed by accelerator 402. Input data array 600 can include N sets of multi-channel input data array/matrices to be processed by accelerator in N batches.

Memory subsystem 404 can be organized to store at least part of multi-dimensional input data array 600. Specifically, as shown in FIG. 6A, memory banks 414 of memory subsystem 404 can be organized into N partitions including partition 0, partition 1, . . . partition N−1. Each partition can be coupled with one row of processing engines 411 of processing Engine Array 410 (not shown in FIG. 6A). Each partition can store input data of one or more input channels. A set of multi-channel two-dimensional input data array 602 can be split among the partitions based on input channels. For example, data of input channel 0 of input data array 602 can be stored in partition 0, data of input channel 1 can be stored in partition 1, etc. In a case where the number of partitions (N) is smaller than the number of input channels (C), two-dimensional input data array 602 can fold at partition N−1, and the data of the subsequent input channel N can be stored at partition 0. In the example of FIG. 6A, the number of partitions can be half of the number of input channels, and input data array 602 can be folded into two halves with each half split among the partitions. In each partition, the two-dimensional input data array can be stored in a row-major format, in which a row of input data elements (along width W) can be stored in a consecutive memory spaces, followed by another row, and input data of a length of a product of HW of a particular channel can be stored one partition. Each partition can also store input data elements of multiple batches.

In some examples, the mapping of the partitions of memory subsystem 404 and the input channels of the multi-channel input data array 602 can be performed by a compiler, which can perform management of resources for memory subsystem 404 based on, for example, determining where to store the input data at memory subsystem 404, when memory subsystem 404 is to fetch the input data from the external memory, etc., and generate computation instructions that reflect the addresses of the input data at memory subsystem 404 (e.g., memory fetch parameters 430). In some examples, the management of memory subsystem 404 can be performed by a memory management entity other than the compiler, and the entity can provide the addresses of the input data at memory subsystem 404 to compiler to generate the computation instructions.

Figure 6B:
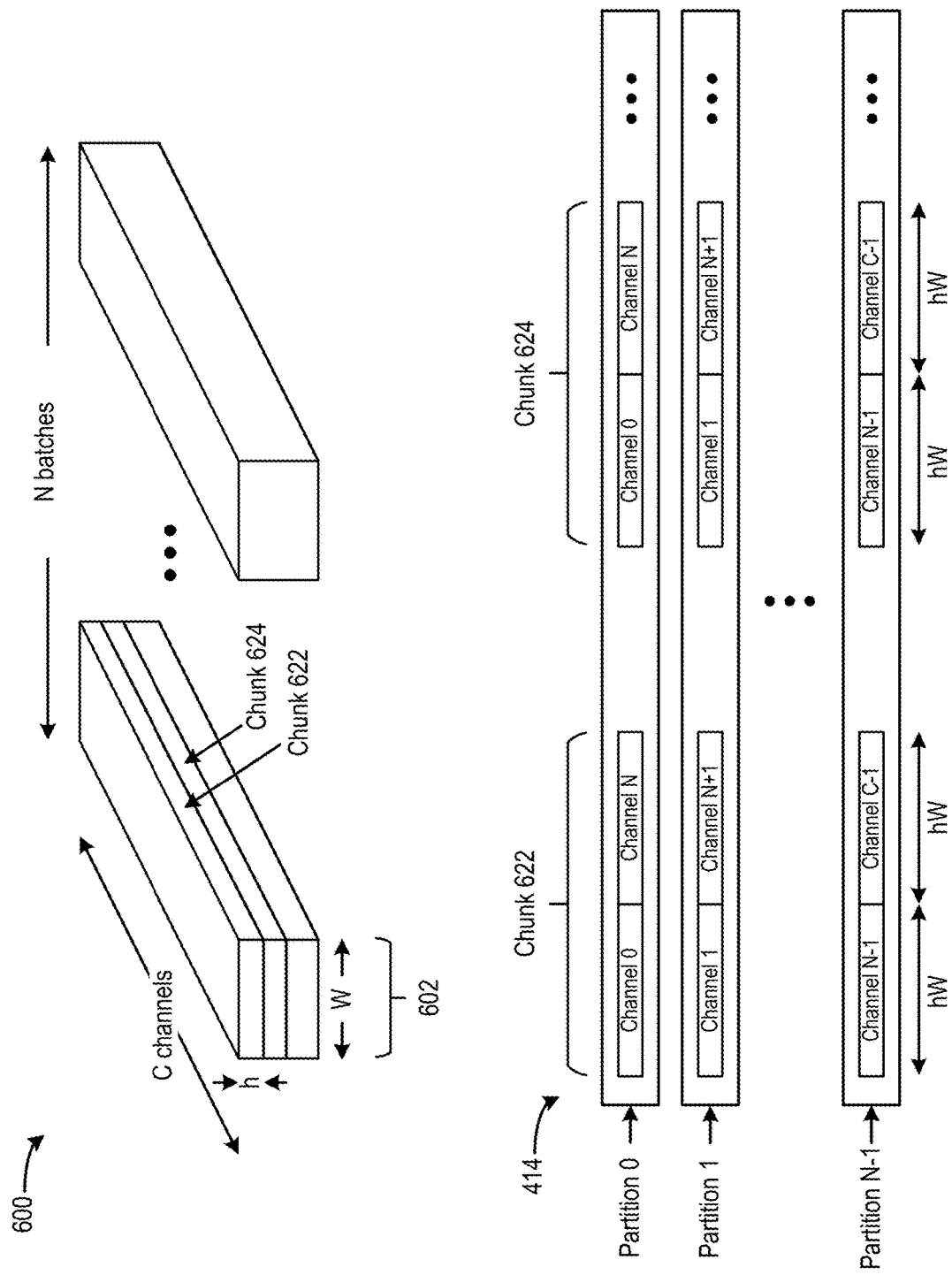

In some examples, to facilitate management of memory subsystem 404, the compiler (or a memory management entity) can fragment a multi-channel two-dimensional input data array 602 into a plurality of chunks, and determine where the chunks are stored in memory subsystem 404. Each chunk can occupy a contiguous space in each partition and can include a subset of input data elements of the array that spans the multiple channels. FIG. 6B illustrates examples of a chunk. As shown in FIG. 6B, input data array 602 can be fragmented into a number of chunks including a chunk 622 and a chunk 624. Each chunk can include input data elements of the full range of input channels of input data array 602, which include channel 0, channel 1, . . . channel C−1, and can also fold at partition N−1 if the number of input channels is larger than the number of partitions. For each input channel, a chunk can include a part of the two-dimensional input array, such as a region of height h (out of H) and full width W.

Figure 6C:
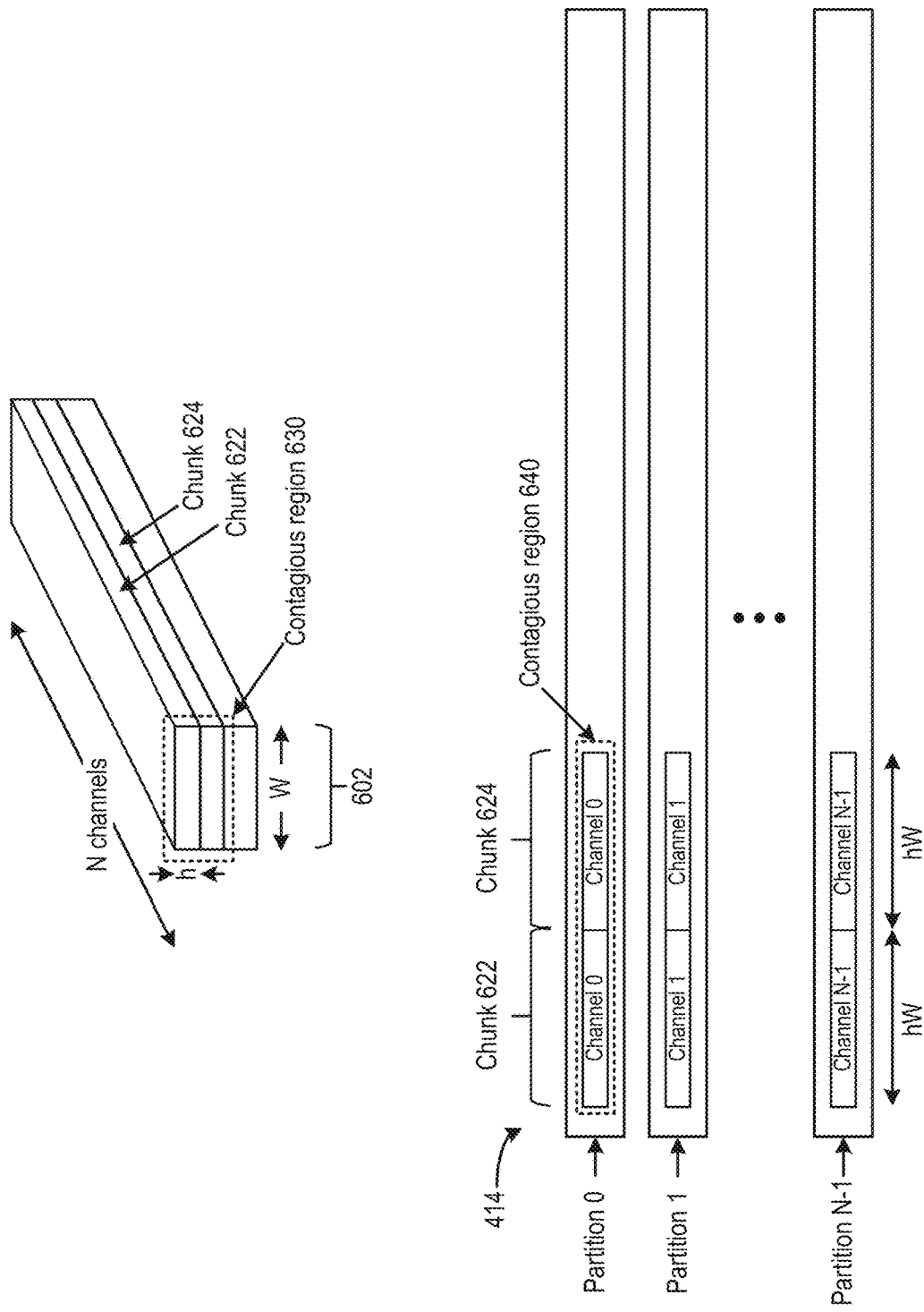
Figure 6D:
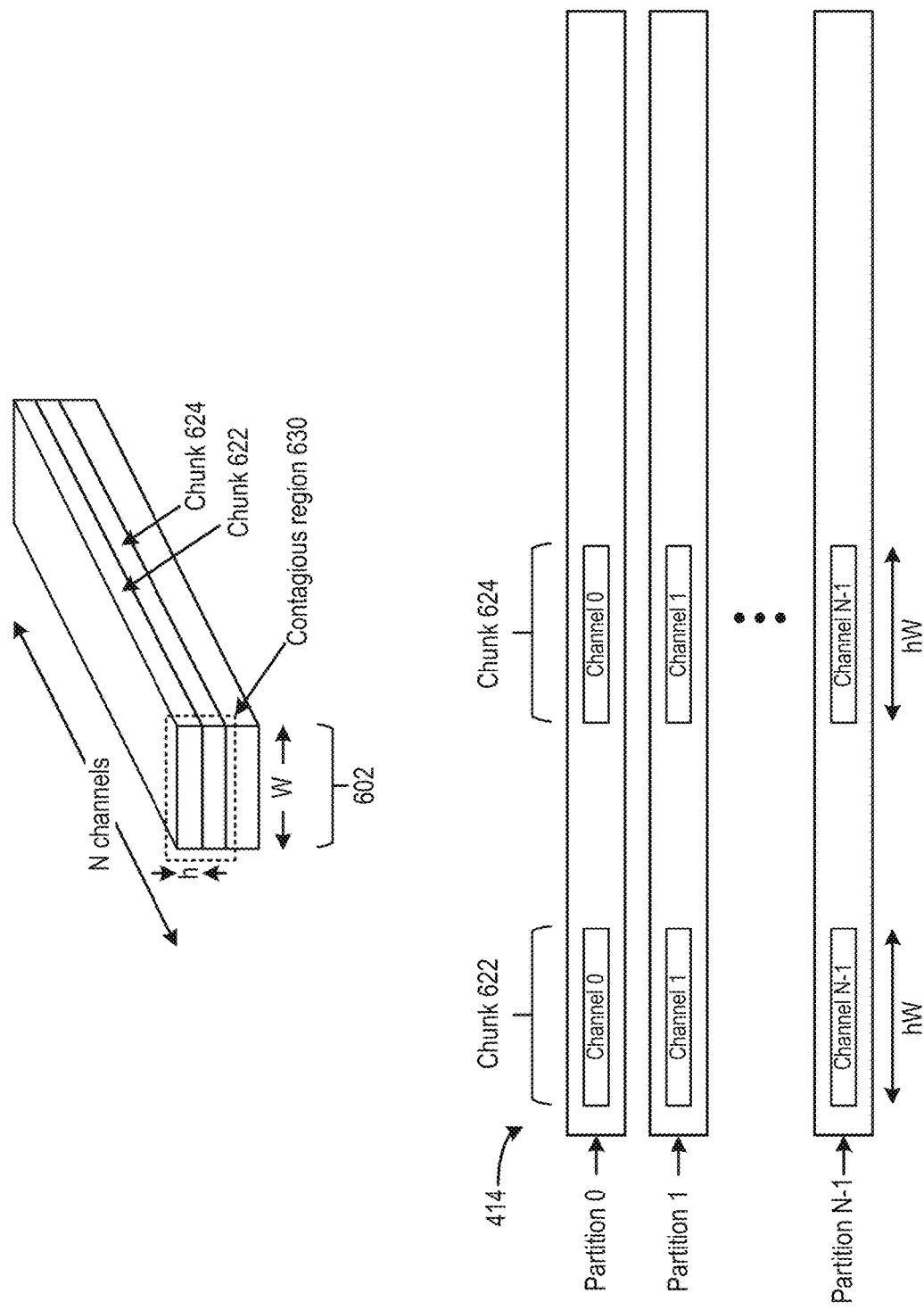

In some examples, the number of input channels can match with or is smaller than the number of partitions and there is no folding. In such examples, as shown in FIG. 6C, the chunks can be arranged in memory banks 414 such that input data elements of a contiguous region (e.g., contiguous region 630) in input data array 602 but split into chunks 622 and 624 can be stored in a contiguous region (e.g., contiguous region 640) in each partition. Such arrangements can be based on storing chunks of input data elements in memory banks 414 sequentially following a pre-determined order. In some examples, as shown in FIG. 6D, chunks 622 and 624 can also be separated by other chunks of input data elements, such that input data elements of contiguous region 630 are not stored in a contiguous region in each partition. Such arrangements can be based on storing chunks of input data elements in memory banks 414 randomly (e.g., based on available space), especially in a case where accelerator 402 is performing convolution operations for different neural network models, and the compiler use memory banks 414 to store input data elements for the different neural network models. In such a case, the compiler can determine that a chunk is stored in any available space it can find in memory banks 414, to maximize the utilization of memory banks 414.

Figure 6E:
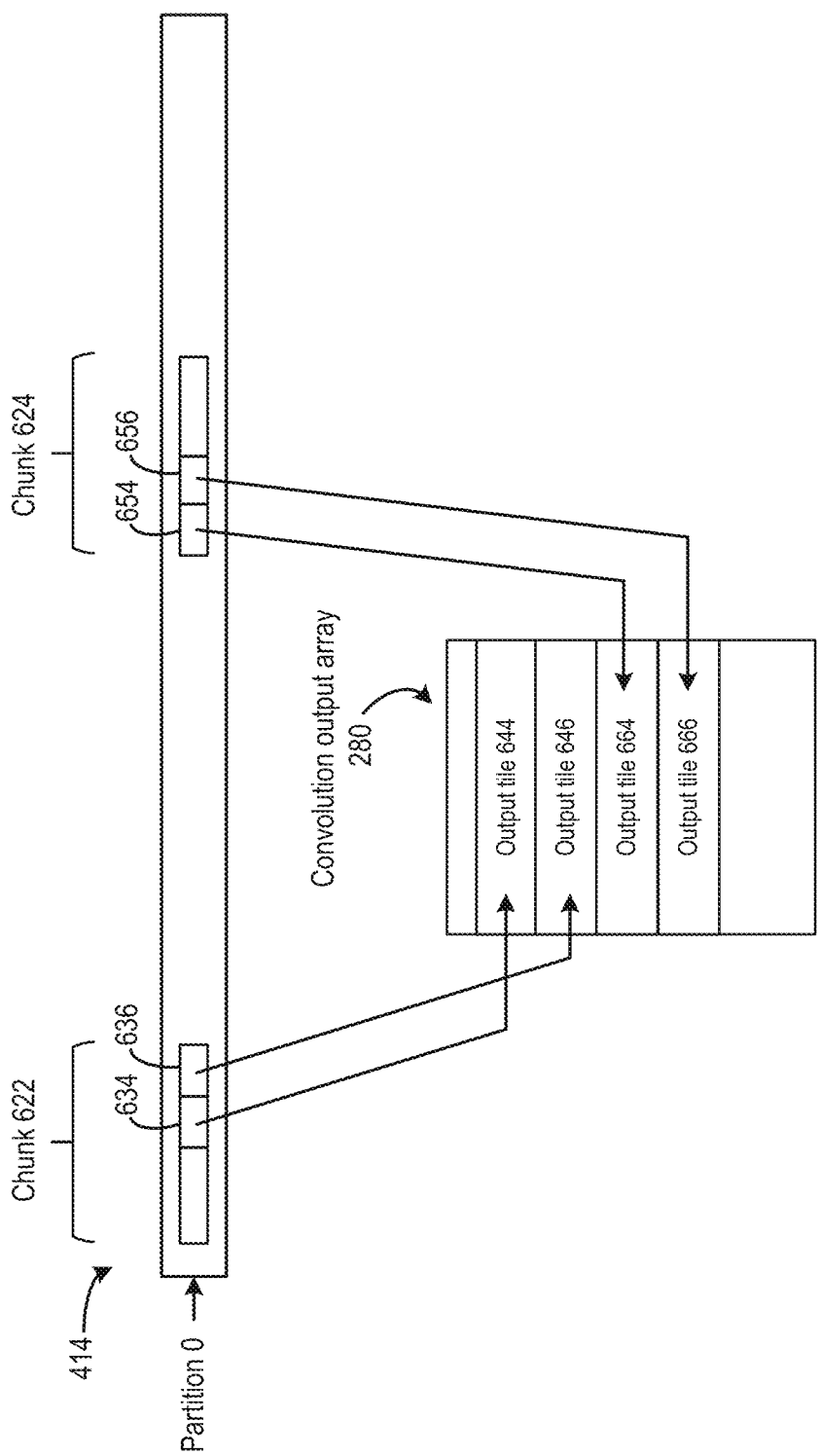

A chunk can include input data elements that are to be convolved with the weight data array to generate one or more output tiles in the projection operations described in FIG. 5B-FIG. 5D. For example, as shown in FIG. 6E, chunk 622 may include a region 634 and a region 636 of input data array 602 which can provide input data elements for the generation of an output tile 644 and an output tile 646 of convolution output array 280. Moreover, chunk 624 may include a region 654 and a region 656 of input data array 602 which can provide input data elements for the generation of an output tile 664 and 666 of convolution output array 280. In some examples, input data elements can be loaded from an external memory (e.g., an off-chip memory, such as a DRAM) via the DMA engine in the units of chunks, and a size of the chunk can be configured to improve the efficiency of the DMA transfer. For example, a size of the chunk can be configured to reach a pre-determined ratio between a size of the data being transferred and a size of the overhead data.

Figure 6F:
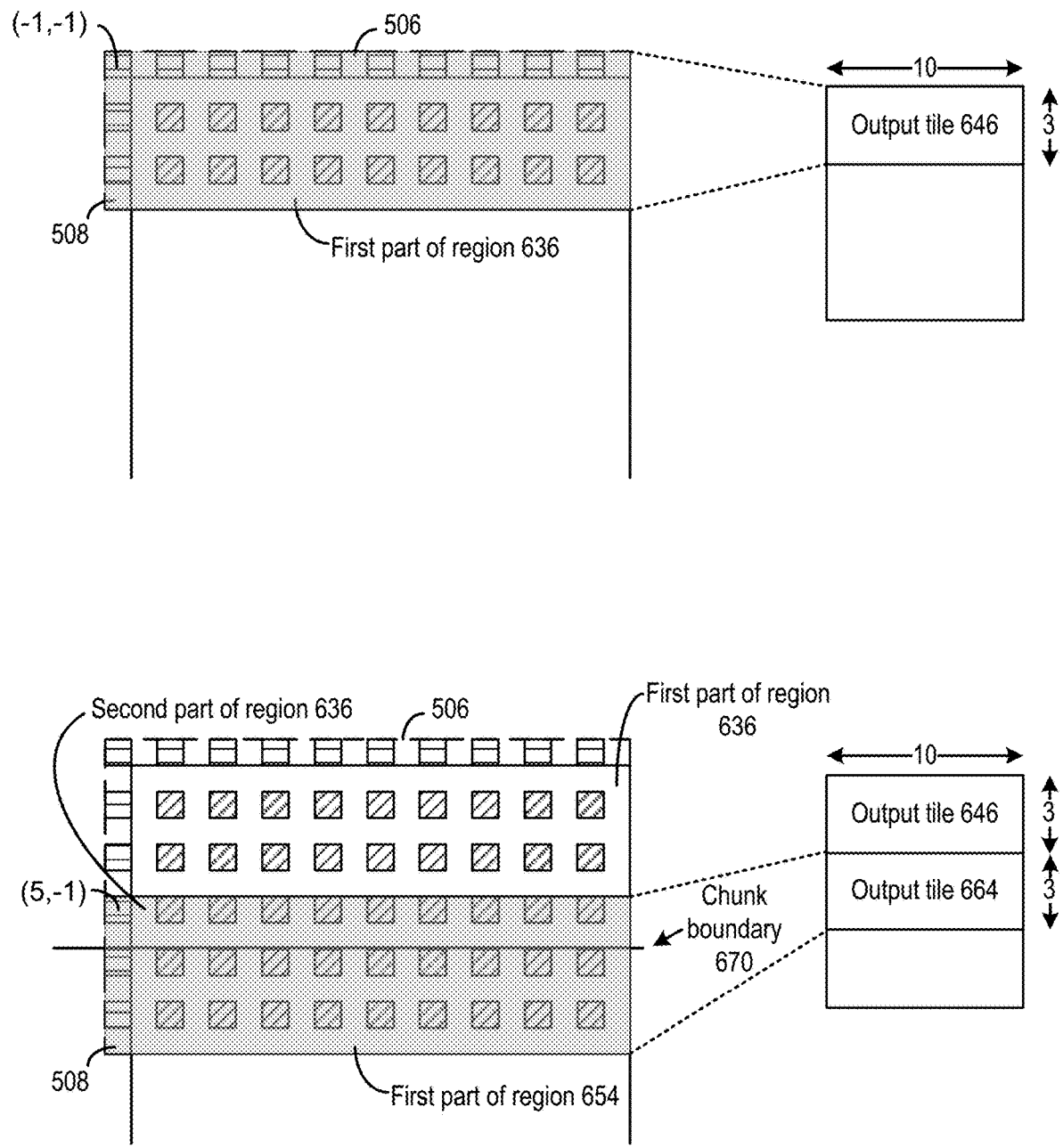

When performing the projection operation and determining the subset of input data elements for a weight data element, the compiler needs to be aware of the chunk boundary to ensure that the subset of input data elements is selected from a contiguous memory region. As described above, the compiler can represent the subset of input data elements as memory fetch parameters 430 including start address, step, and number of fetch elements. The start address is for a contiguous memory region. If the subset of input data elements are split into two non-contiguous memory regions, the start address can become invalid for the input data elements located in the second memory region. FIG. 6F illustrates such an example. As shown in FIG. 6F, for a certain weight data element, output tile 646 can be projected back to a first region (after shifting based on the coordinates of that weight data element with respect to a first reference location (−1, −1)) of a zero-padded input data array comprising row 506 of zeros, column 508 of zeros, and a first part of region 636 of chunk 622 can be projected to output tile 646. Moreover, for that weight data element, output tile 664 can be projected to a second region (after shifting based on the coordinates of that weight data element with respect to a second reference location (5, −1)) of the zero-padded input data array comprising column 508 of zeros, as well as a second part of region 636 (of chunk 622) and a first part of region 654 (of chunk 624) on two sides of a chunk boundary 670 between chunk 622 and chunk 624. For output tile 664, if chunks 622 and 624 are not in a contiguous memory region as shown in FIG. 6D, the compiler cannot use a single set of memory fetch parameters 430 including a single start address to represent the subset of input data elements for output tile 664.

Figure 7A:
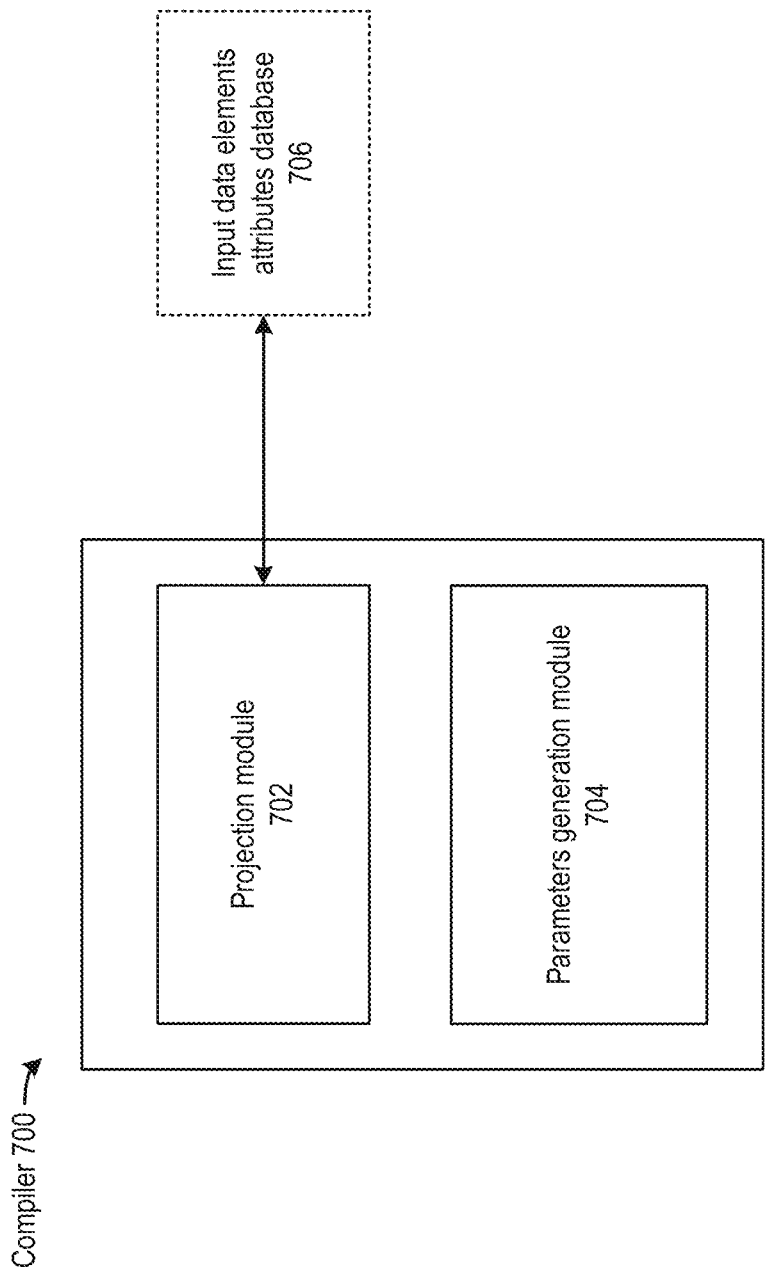

FIG. 7A to FIG. 7D illustrate example components of a compiler 700 to generate memory fetch parameters 430 and buffer write parameters 452 based on detecting contiguous memory regions among the chunks. As shown in FIG. 7A, compiler 700 may include a projection module 702 and a parameters generation module 704. Projection module 702 can perform the projection operations as described in FIG. 5B-FIG. 5D to determine a first region in the input data array based on the stride of the convolution operation, the coordinates of a weight data element, and the location of an output tile in the convolution output data array. For example, the compiler can determine a first region of input data array by scaling up/down an output tile based on the stride, determine a range of coordinates of the first region in the input data array based on the location of the output tile in the convolution output data array, and shift the projected region with respect to a reference point based on the coordinates of the weight data element.

Projection module 702 can then access an input data elements attributes database 706 to determine whether the input data elements of the first region are in a contiguous memory region (e.g., being part of a chunk, or in chunks that are in a contiguous memory region). If the first region is across two non-contiguous memory regions, projection module 702 can split the first region into two sub-regions. Projection module 702 can align a stride pattern, which can define a pattern of coordinates of input data elements that overlap with the weight data element during the convolution operation, with each sub-regions. Both sub-regions are also shifted with respect to the reference location based on the coordinates of the weight data element. Projection module 702 can align a stride pattern, which can define a pattern of coordinates of input data elements that overlap with the weight data element during the convolution operation, with each sub-region to identify coordinates of a subset of input data elements to multiply with the weight data elements to generate partial sums for the output tile. Parameters generation module 704 can generate memory fetch parameters 430 and buffer write parameters 452 based on the coordinates of the subset(s) of input data elements in the first region (if the first region is within a chunk) or in the two sub-regions (if the first region is across multiple chunks that are stored in non-contiguous regions of the memory).

FIG. 7B illustrates an example of information stored in input data elements attributes database 706. As shown in FIG. 7B, input data elements attributes database 706 can store a set of attributes for each input data elements of an input data array. The attributes may include the coordinates of an input data element in the input data array, an identifier of a chunk that stores the input data element, and a location of the chunk in the memory. The location of the chunk can be based on, for example, an address offset (e.g., in bytes) with respect to a start address of each partition. In FIG. 7B, assuming that each chunk includes 512 bytes of data in a partition, an offset of 1024 between two chunks of chunk ID 0 (e.g., chunk 622) and of chunk ID 1 (e.g., chunk 624) can indicate that the two chunks are separated by 512 bytes in the partition and are non-contiguous.

Figure 7C:
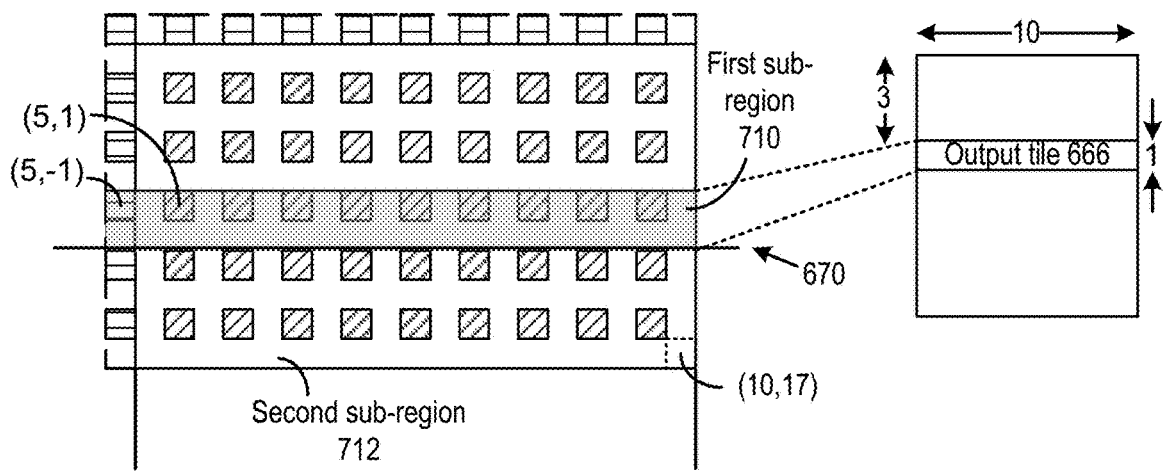
Figure 7C:
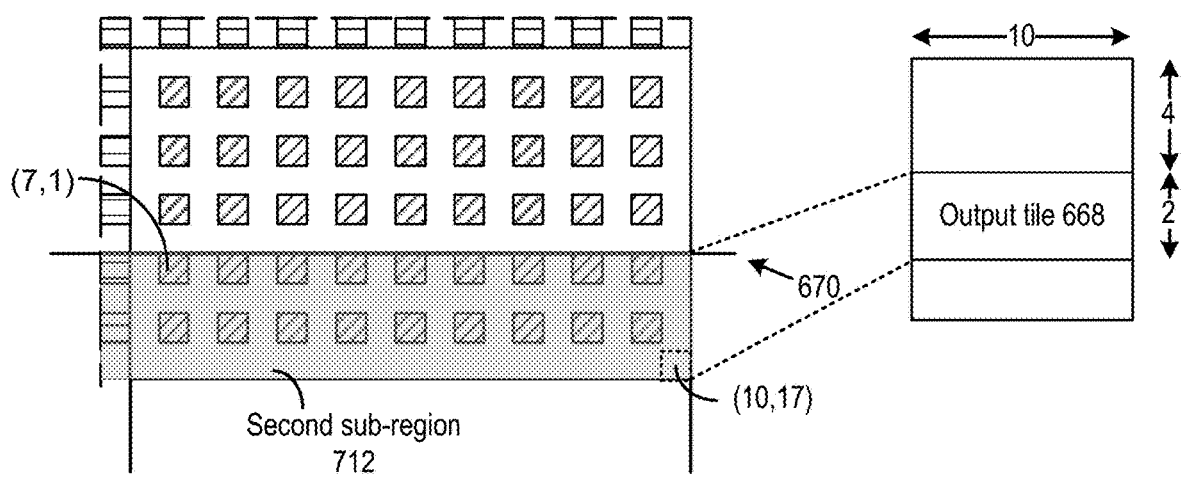

FIG. 7C illustrates projection operations by compiler 700 for generation of output tile 664. As described in FIG. 6F, from a projected region from output tile 664 may include input data elements across chunks 622 and 624 which are non-contiguous. Compiler 700 can detect that the projected region include non-contiguous memory regions based on input data elements attributes database 706. Specifically, based on the starting coordinates of output tile 664 (e.g., (3, 0)), the stride of the convolution operation (e.g., 2), and the coordinates of a weight data element (e.g., (0, 0)), compiler 700 can determine a first region having the upper-left corner at (5, −1) (at row 506 of zero) and the lower-right corner at (10, 17). Compiler 700 can then access input data elements attributes database 706 to determine the chunk ID and the chunk location for each input data elements within the first region between the coordinates (5, −1) and (10, 17), and determine that a first sub-region 710 between (5, −1) and (5, 17) is in chunk 622 and a second sub-region 712 between (6, −1) and (10, 17) is in chunk 624, and the two sub-regions are non-contiguous.

Figure 7D:
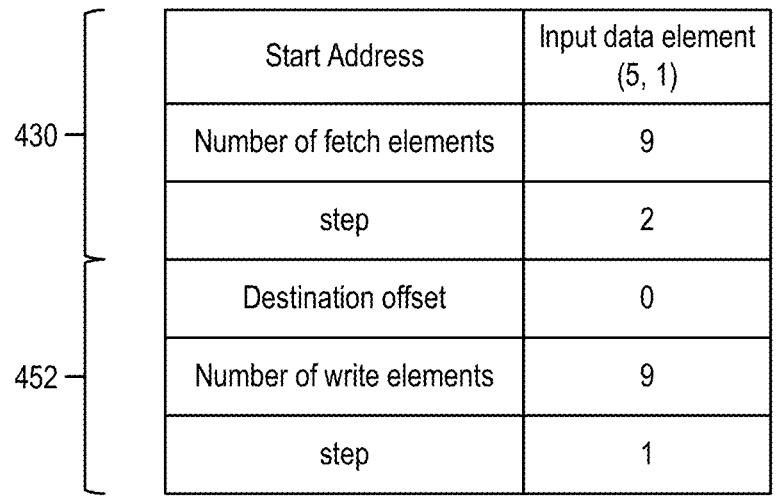
Figure 7D:
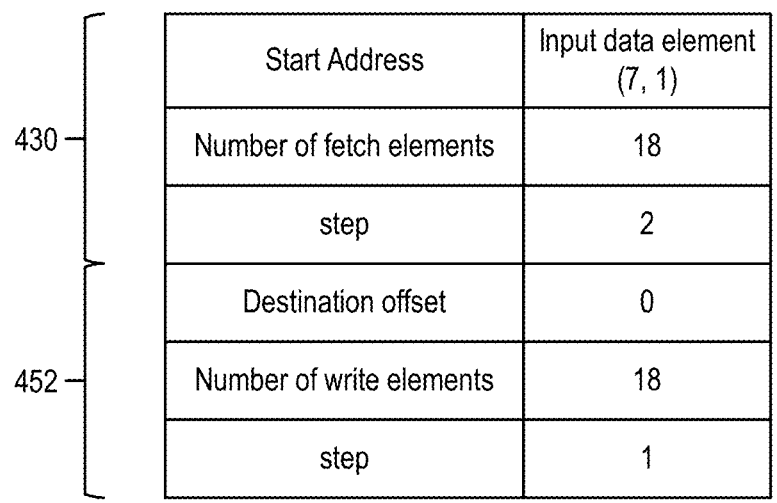

Compiler 700 can then generate one set of memory fetch parameters 430 and buffer write parameters 452 to generate a first output tile 666 from the input data elements of first sub-region and a second output tile 668 from the input data elements of the second sub-region, with first output tile 666 and second output tile 668 combined as output tile 664. Specifically, compiler 700 can align stride pattern 550 with first sub-region 710 and identify a first subset of input data elements in first sub-region 710 starting at (5, 1), with a step of 2, and including 9 input data elements. Further, based on the multiplication of the 9 input data elements with the weight data elements, 9 partial sums are to be accumulated at the column summation buffer with the first entry skipped. Moreover, compiler 700 can align stride pattern 550 with first sub-region 710 and identify a second subset of input data elements in second sub-region 712 starting at (7, 1), with a step of 2, and including 18 input data elements. Further, based on the multiplication of the 18 input data elements with the weight data elements, 18 partial sums are to be accumulated at the column summation buffer with the first entry skipped. To maintain a shape of a rectangular region, the 18 partial sums can be accumulated in a 9×2 region at the column summation buffer with the first column of entries skipped. FIG. 7D illustrates memory fetch parameters 430 and buffer write parameters 452 generated from first sub-region 710 (top table) and second sub-region 712 (bottom table).

Figure 8:
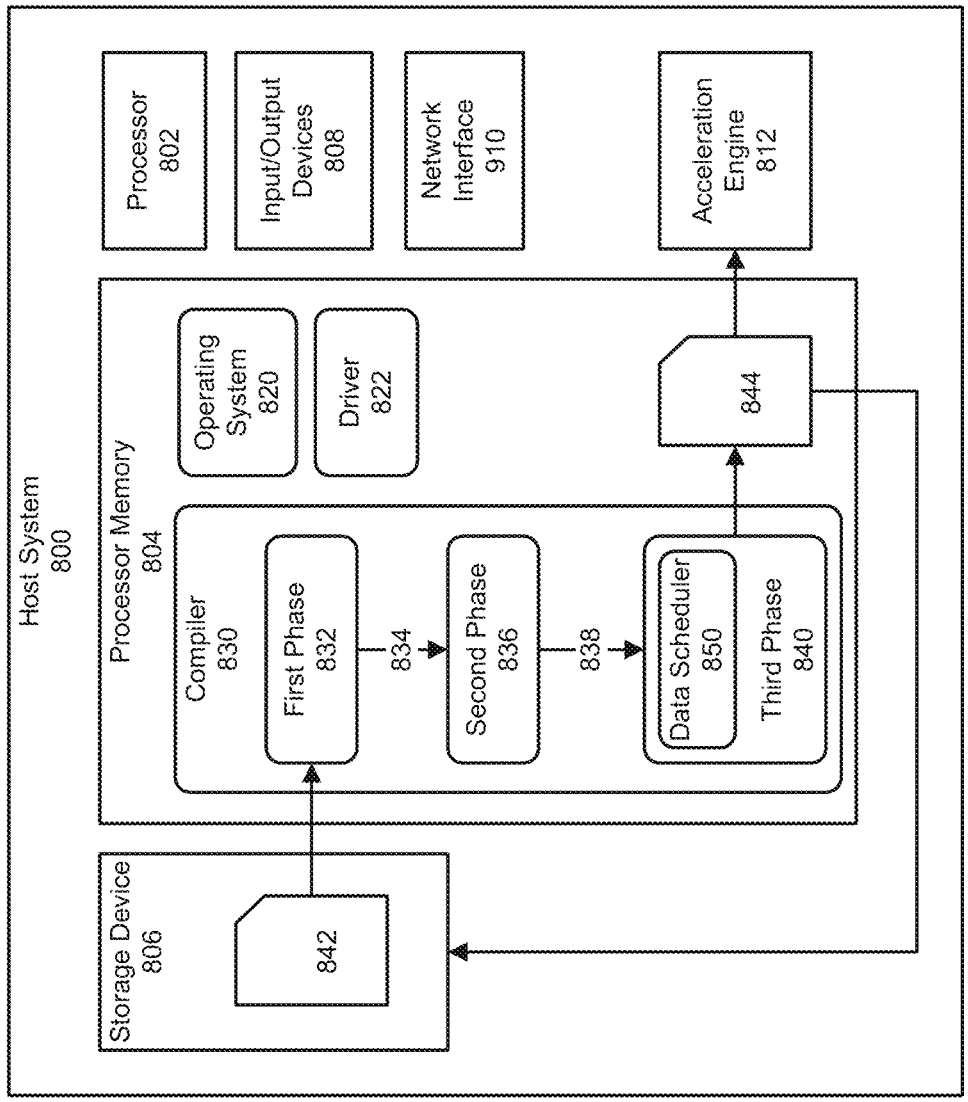
FIG. 8 includes a block diagram that illustrates an example of a host system, according to certain aspects of the present disclosure.

FIG. 8 includes a block diagram illustrating an example of a host system 800 on which a compiler 830, such as is described herein, can run. The illustrated host system 800 is an example of a computing device, and includes a processor 802, a processor memory 804, at least one storage device 806, various Input/Output (I/O) devices 808, and at least one network interface 810. In the example of FIG. 8, the host system 800 also includes an acceleration engine 812, which can include accelerator 402 of FIG. 4A-FIG. 4C. In various examples, the host system 800 can be implemented as a server in a data center, a desktop computer, a laptop computer, a tablet computer, or a smartphone, among other examples. In some examples, operations or components discussed below as performed or included in the host system 800 can be performed or included in other computer devices. For example, the compiler 830 can execute on the host system 800 while the acceleration engine 812 is located at a different host system.

The processor 802 is an integrated circuit device that can execute program code, in the form of instructions. The program code can be for various software applications or tools, such as an operating system 820 or the illustrated compiler 830. While the processor 802 is executing a program, the instructions for the program can be stored in the processor memory 804. The instructions can also be stored elsewhere, such as on the storage device 806, and can be loaded into the processor memory 804 when needed by the processor 802. The processor 802 can also use the processor memory 804 for temporary storage of other data on which the processor 802 is operating. In various examples, the processor memory 804 is a volatile memory type, such as a type of Random Access Memory, though non-volatile memory types can, alternatively or additionally, be used for the processor memory 804.

The storage device 806 is an example of a device that can include non-volatile memory. For example, the storage device 806 can be a magnetic disk drive, a solid state drive, or an optical drive, among other examples. The storage device 806 can further be non-transitory, such that program code and other data stored on the storage device 806 remains present when the storage device 806 is not powered on.

The storage device 806 is one example of a peripheral device, which are components that can be coupled to the host system 800 to add functionality to the host system 800. Other examples of peripheral devices include the Input/Output devices 808 and the network interface 810. The Input/Output devices 808 can include user input and output devices, such as keyboards, mice, touch screens, microphones, display screens, speakers, printers, and scanners, among other examples. The network interface 810, which can be implemented using a network interface card, can provide access to one or more networks. The network interface 810 can include, for example, a physical port for connecting a network cable and/or wireless antennas for communicating with Wi-Fi and/or cellular networks. The network interface 810 can also be described as an I/O device.

The acceleration engine 812 is also another type of peripheral device or I/O device. The acceleration engine 812 is a device that is purpose built to perform certain operations that can be performed by the processor 802, but can be performed faster by the acceleration engine 812. For example, the acceleration engine 812 can be a neural network accelerator, and, as such, may be able to perform the large scale, parallel computations of a neural network more efficiently than when the computations are performed by the processor 802. As another example, the acceleration engine 812 can be a graphics processing unit (GPU), and may be optimized to perform the computations needed for graphics rendering. Other examples of devices that can be implemented by the acceleration engine 812 include cryptographic accelerators, compression and decompression accelerators, 3-D accelerators, regular expression accelerators, security accelerators, and others.

In various examples, the acceleration engine 812 can execute program code to perform certain operations. For example, when the acceleration engine 812 is a neural network accelerator, the acceleration engine 812 can be programmed to execute a particular neural network, such as one that performs image recognition or one that performs machine translation. As a further example, to support the execution of a neural network, the acceleration engine 812 can be programed to perform operations such as copying data for the neural network from processor memory 804 (for example) into the acceleration engine 812, copying input data for the neural network from processor memory 804 into the acceleration engine 812, and/or copying results from the acceleration engine 812 into the processor memory 804, among other examples.

To generate program code for the acceleration engine 812, in various examples, the host system 800 can execute the compiler 830. Compilers, in general, are software programs that translate program code written in a human-readable language into a format (e.g., machine instructions) that can be read and processed by an integrated circuit device. In the example of FIG. 8, the acceleration engine 812 is a neural network accelerator and the compiler 830 is for compiling a neural network description into instructions to be executed by the acceleration engine 812. When the acceleration engine 812 implements a different type of accelerator, another compiler can be used.

The compiler 830 can be activated, for example, when the operating system 820 receives keyboard, mouse, touchscreen, voice commands, or other inputs from the Input/Output devices 708. The inputs can further include parameters for the compiler 830, such as the input code 842 to compile and configuration options for the compilation process. Once the compiler 830 is activated, the processor 802 can load the instructions for the compiler 830 into the processor memory 804, and can execute the instructions.

In the example of FIG. 8, the compiler 830 includes a first stage 832, a second stage 836, and a third stage 840, which each perform different operations to produce compiled code 844. In other examples, the compiler 830 can combine the operations of the first stage 832, second stage 836, and/or third stage 840 into fewer stages, or can divide the operations of one of the stages into multiple stages.

The first stage 832 can receive and process input code 842. The input code 842 can describe a program in a high-level programming language, such as Java, C++, or Tensorflow, among many other examples. The input code 842 can describe, for example, steps to perform image recognition, speech recognition, machine translation, or other operations. The input code 842 can be obtained, for example, from the storage device 806. Alternatively, though not illustrated here, the input code 842 may be located in the processor memory 804 or can be obtained from a network location, using the network interface 810. Processing of the input code 842 can include sorting the operations described in the input code 842 into layers, where the outputs of one layer provide the inputs to a next layer. Processing can also include identifying steps to be performed by the processor 802, rather than by the acceleration engine 812. For example, the processor 802, through the execution of a driver 822, may need to perform steps such as configuring Direct Memory Access (DMA) descriptors for moving data into or out of the acceleration engine 812, among other examples.

The output 834 of the first stage 832 can be organized, for example, in the layers, nodes, and connections between nodes of a neural network. The second stage 836 can perform intermediate processing on this output 834. For example, the operations performed in any one layer, or at any one node in a layer, may be too many for the acceleration engine 812 to perform at the same time. The acceleration engine 812 may, for example, have a limited amount of locale storage space for the data needed for a computation, or the computations may be more than the acceleration engine 812 can perform at one time. In this example, the first stage 832 can break the operations of the layer or node down into smaller operations, which can fit into the acceleration engine's local memory and/or can fit into the computing capacity of the acceleration engine 812. Processing of the output 834 of the first stage 832 can include other steps, such as scheduling, or determining the order in which the acceleration engine 812 and/or processor 802 will perform operations, among other examples.

In various examples, the output 838 of the second stage 836 includes the various steps to be performed by components of the acceleration engine 812, in the order that the steps are to be performed. The output 838 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 840 can operate on the output 838 of the second stage 836, and perform various steps before producing the instructions that are to be executed by the acceleration engine 812. These steps can include, for example, removing redundant dependencies, resolving or handling dependencies between nodes by inserting synchronization instructions into the code, identifying possibly optimizations in memory usage or memory bandwidth usage, and other operations.

In some examples, the third stage 840 can include a data scheduler 850 to schedule movement of data, such as input data and weight data, in acceleration engine 812 to support various operations, such as convolution operation as described above. For example, data scheduler 850 can obtain an instruction (e.g., from the data flow graph) to perform a convolution operation between an input data array and a filter array to generate a convolution output array. Based on the size of the summation buffer at acceleration engine 812, data scheduler 850 can determine the output tiles that fit into the summation buffer, and can determine sequences of instructions to stage the convolution operations to generate one output tile at a time. For each instruction, data scheduler 750 can determine the sequence of loading the weight data elements of the filter array into processing engine array 410, and determine subsets of the input data to be loaded into processing engine 410 for each weight data element based on the techniques described above in FIG. 5A-FIG. 7D, such as performing a projection operation from the summation buffer to determine a region of input data array (e.g., region 530) based on stride, determining whether the region belongs to the same chunk, and splitting the region across chunk boundaries into sub-regions if the region covers multiple non-contiguous chunks, shifting the region (and/or the sub-regions) with respect to the input data array for different weight data elements based on the coordinates of the weight data elements, overlaying a stride pattern onto the shifted region/sub-region, and determining coordinates of the input data elements overlapping with the stride pattern, which are also the subset of input data to be provided to processing engine array 410 to multiply with the weight data element. Data scheduler 850 can translate the coordinates to addresses and include the addresses as part of the memory fetch parameters 430 instructions. Moreover, based on the projection operation (and the splitting of the projected region), data scheduler 850 can also determine the set of buffer write parameters 452 including a destination offset and a number of write elements. Data scheduler 850 can then generate instructions to control acceleration engine 812 to load the weight data elements and the corresponding subsets of input data elements to perform the convolution operations.

The output of the third stage 840 is compiled code 844, which may include machine instructions in binary format. In some examples, the compiled code 844 can be stored in the processor memory 804. Alternatively or additionally, the compiled code 844 can be copied to the storage device 806 or to a network location. As noted above, the acceleration engine 812 may be located at a different host system, in which case the compiled code 844 can be sent over the network interface 810 to the other host system.

In the example of FIG. 8, the host system 800 can be executing a driver 822, which can also be referred to as a device driver or runtime driver, that manages the acceleration engine 812. The driver 822 can provide an interface between applications executing on the host system 800 (or on another host system) and the acceleration engine 812. For example, the driver 822 can provide an Application Program Interface (API) that defines functions for feeding input data to the acceleration engine 812 and defining the operation to perform on the input data. In this and other examples, the driver 822 can configure the acceleration engine 812 to perform the operation. For example, the driver 822 can identify a neural network that the acceleration engine 812 is to execute, as well as the location in the processor memory 804 or on the storage device 806 where the compiled code 844 for the neural network is located. The driver 822 can further load into the acceleration engine 812 or cause the acceleration engine 812 to load the compiled code 844, can load or cause the acceleration engine 812 to load the input data on which the neural network is to operate, and/or can cause the acceleration engine 812 to being executing on the input data. Once the acceleration engine 812 has finished, the acceleration engine 812 can notify the driver 822, and the driver 822 can deliver a result back to the application that requested the result.

Figure 9:
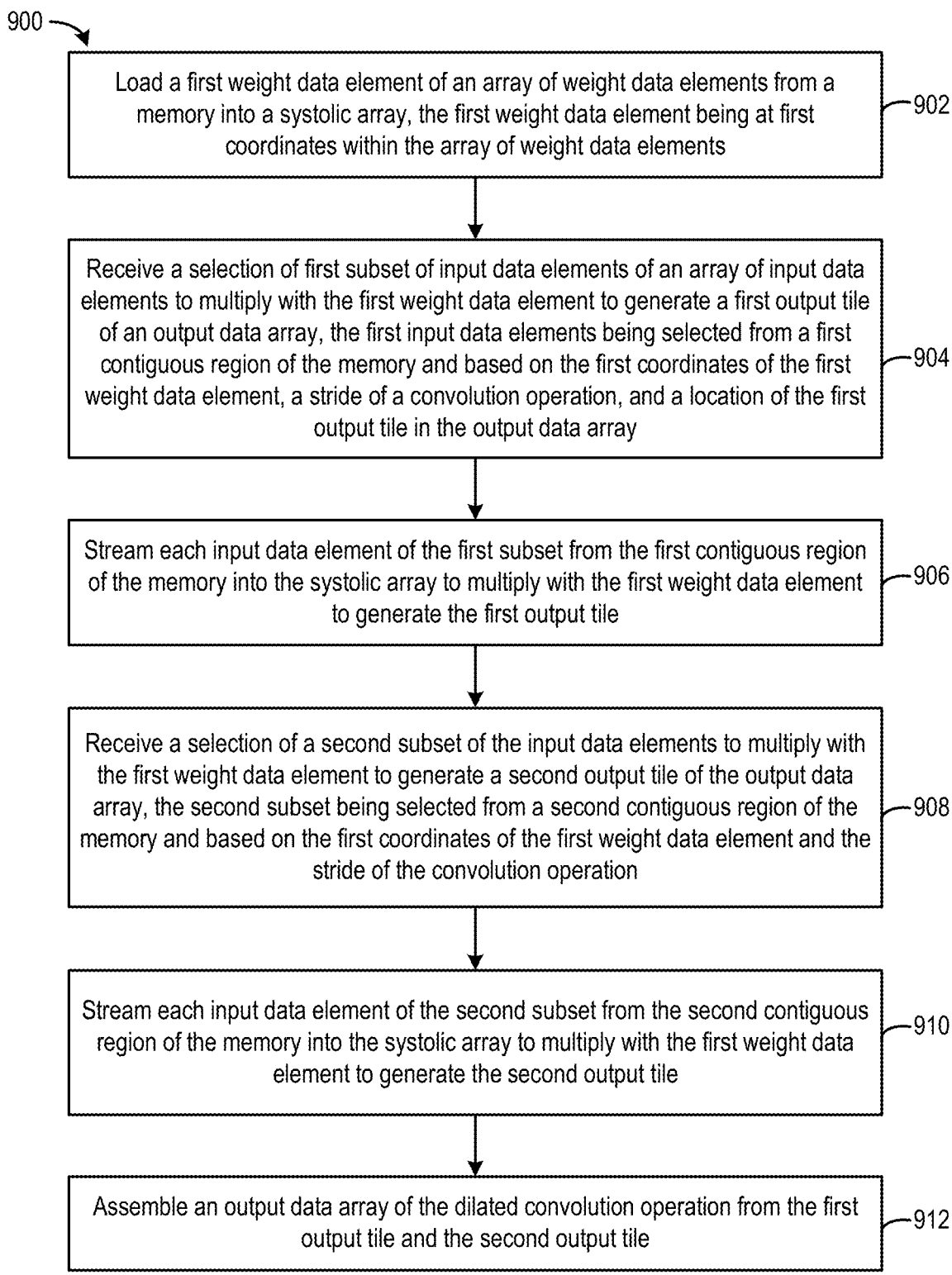
FIG. 9 illustrates an example method of performing a convolution operation at a neural network processor, according to certain aspects of the present disclosure.

FIG. 9 illustrates a flowchart of an example method 900 for performing a convolution operation. Method 900 can be performed by, for example, various components of accelerator 402 including memory subsystem 404, processing engine array 410, summation buffer 412, and controller 422.

Method 900 begins with step 902, in which a controller (e.g., controller 422) can load a first weight data element of an array of weight data elements from a memory (e.g., memory subsystem 404) into a systolic array (e.g., processing engine array 410), the first weight data element being at first coordinates within the array of weight data elements. The first weight data element can be obtained from memory subsystem 404 based on the first coordinates. The weight data elements can be stored in memory subsystem 404 in addresses that reflect the coordinates the weight data elements in the array of weight data elements. Controller 422 can be provided with an address of the first weight data element in a first computation instruction, and can obtain the first weight data element based on the address from memory subsystem 404 upon executing the first computation instruction. Moreover, as described above, each processing engine 411 can store a weight data element, and the controller can send the first weight data element to a processing engine 411 for storage.

In step 904, the controller can receive a selection of a first subset of an array of input data elements to multiply with the first weight data element to generate a first output tile of an output data array. The first subset of input data elements can be selected from a first contiguous region of the memory and based on the first coordinates of the first weight data element, a stride of a convolution operation, and a location of the first output tile in the output data array. The selection can be represented by, for example, a first set of memory fetch parameters 430, which can include a start address, step, and number of elements. The start address and the number of elements can reflect input data elements that overlap with the first weight data element when the array of weight data elements is at various stride locations at a first region of the input data elements in the convolution operation. The selection can be based on the first coordinates of the first weight data element in the array of weight data elements and a stride of the convolution operation. The first subset of input data elements are to be multiplied with the first weight data element at the processing engine 411 to generate first partial sums, which can be forwarded to a column summation buffer (e.g., column summation buffer 442) of summation buffer 412.

The determination of the first subset of input data elements can be based on a projection operation. Specifically, the dimensions of the summation buffer (e.g., numbers of columns and rows) can define the dimension of an output tile comprising output data elements of a first region in the output data array. The first region can be defined by a range of actual coordinates in the output data array. Based on the projection operation, which takes into the first region of output data array coordinates, the stride of the convolution, and the location of the first output tile, the compiler can determine a second region comprising input data elements to be convolved with the first weight data element. The second region can be defined by a range of target coordinates of input data elements. The compiler can determine whether the second region belongs to the same chunk, and split the region across chunk boundaries into sub-regions if the region covers multiple non-contiguous chunks. The second region (or the sub-regions) can be shifted by an offset based on the coordinates of the first weight data element in the weight data array. The compiler can then align a stride pattern with the shifted second region (or the sub-regions) to identify overlapping input data elements as the first subset. The start address of the first subset can be based on the address of the first input data element in the second region and/or in the sub-regions, whereas a count of the overlapping input data elements can set the number of fetch elements parameter. The step parameter is set to two based on the stride pattern, which can reflect the stride of the convolution operation.

In step 906, the controller can stream each input data element of the first subset starting from a first address from the memory into the systolic array to multiply with the first weight data element to generate the first output tile. The input data elements can be sent, sequentially, to the processing engine 411 which stores the first weight data element in step 902. The processing engine 411 can multiply the each input data element with the first weight data element to generate partial sums. The first address can be the start address of the first subset described above. The partial sums can be sent to first destination addresses in the column summation buffer based on the first computation instruction including a first set of buffer write parameters 452, which may include a destination offset, a step, and a number of write elements. The partial sums can be added to the data stored at the first destination addresses. The first set of buffer write parameters 452 can be based on the shifted stride pattern as well, as described in FIG. 6B. Steps 902 to 906 can be repeated for different weight data elements, and the partial sums generated for each weight data element can be accumulated at the column summation buffer to generate the first output tile.

In step 908, the controller can receive a selection of a second subset of the array of input data elements to multiply with the first weight data element. The second subset of input data elements can be selected from a second contiguous region of the memory and based on the first coordinates of the first weight data element and the stride of a convolution operation. The selection can be represented by, for example, a second set of memory fetch parameters 430, which can include a start address, step, and number of elements. The start address and the number of elements can reflect input data elements that overlap with the first weight data element when the array of weight data elements is at various stride locations within a second region of the array of the input data elements in the convolution operation. The second subset of input data elements are to be multiplied with the first weight data element at the processing engine 411 to generate partial sums, which can be forwarded to the column summation buffer (e.g., column summation buffer 442) of summation buffer 412. The second subset can be selected based on the projection operation described in step 904 and include determining whether the projected region is in a chunk or overlaps with multiple non-contiguous chunks, as described above.

In step 910, the controller can stream each input data element of the second subset starting from a second address from the memory into the systolic array to multiply with the second weight data element to generate the second output tile. The input data elements can be sent, sequentially, to the processing engine 411, which can multiply the each input data element with the first weight data element to generate partial sums. The second address can be the start address of the second subset described above. The partial sums can be sent to second destination addresses in the column summation buffer based on the second computation instruction including a second set of buffer write parameters 452. The partial sums can be added to the data stored at the second destination addresses. Step 910 can be repeated for different weight data elements, and the partial sums generated for each weight data element can be accumulated at the column summation buffer to generate the second output tile.

In step 912, the output data array can be assembled from the first output tile, the second output tile, and other output tiles. The assembling can be based on, for example, the coordinates of the output data elements in the first and second output tiles. The output tiles can be sent to activation engine 416 and/or pooling engine 418 for post-processing, and the post-processed output tiles can be assembled at memory subsystem 404 to become the output data array. The output data array can be fed back to processing engine array 410 as input to the next neural network layer, or sent to an external memory via chip interconnect 420 as an output of a neural network computation operation.

Figure 10:
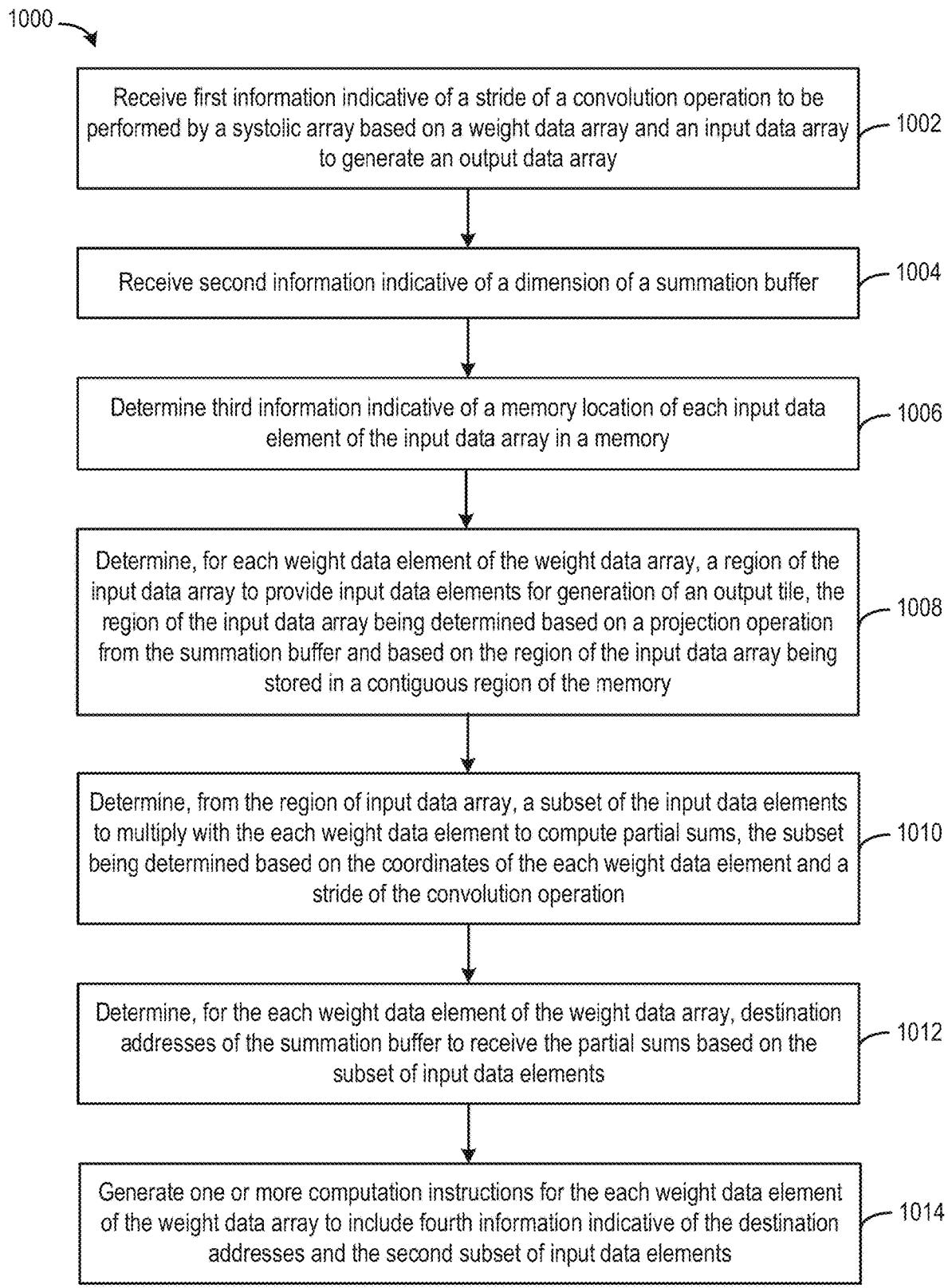
FIG. 10 illustrates an example method of preparing instructions for a neural network processor to perform a convolution operation, according to certain aspects of the present disclosure.

FIG. 10 illustrates a flowchart of an example method 1000 of generating instructions for a neural network processor to perform a convolution operation. Method 1000 can be performed by a compiler, such as compiler 830 of FIG. 8.

Method 1000 starts in step 1002, in which the compiler can receive first information indicating a stride of a convolution operation to be performed by a systolic array (e.g., processing engine array 410) based on a weight data array and an input data array to generate an output data array. The first information can be received from, for example, input code 842 which can represent an application (an image processing operation, etc.) that uses the results of the convolution operation.

In step 1004, the compiler can receive second information indicating a dimension of a summation buffer, such as column summation buffer 442. The summation buffer accumulates and stores partial sums from the systolic array for the convolution operation. The second information can also be received from, for example, input code 842. As described above, the dimension information can be used to determine an output tile and, via a projection operation, can be used to determine a subset of the input data elements of the input data array for each weight data element of the weight data array.

In step 1006, the compiler can receive third information indicative of a memory location of each input data element of the input data array in a memory. The third information can include, for example, attributes information of input data elements including their coordinates, their chunk identifiers, and the locations of the chunks as described in FIG. 7A. The third information can be received from, for example, a memory management system that manages the storage of the input data elements at memory subsystem 404.

In step 1008, the compiler can determine, for each weight data element of the weight data array, a region of the input data array to provide input data elements for generation of an output tile, the region of the input data array being determined based on a projection operation from the summation buffer and based on the region of the input data array being stored in a contiguous region of the memory. Referring back to FIG. 5B and FIG. 5C, the dimensions of the summation buffer (e.g., numbers of columns and rows) can define an output tile comprising output data elements of a first region in the output data array. The first region can be defined by a range of actual coordinates in the output data array. Based on a projection operation, which takes into consideration the first region of output data array coordinates, a stride of the convolution, and the coordinates of a the compiler can determine a second region comprising input data elements to be convolved with the first weight data element. The second region can be based on scaling up/down the first region based on the stride and shifting the scaled first region with respect to a reference location based on the coordinates of the first weight data element. The reference location can be with respect to input data array and based on the location of the output tile in the convolution output data array. The second region can be defined by a range of target coordinates of input data elements. The compiler can determine whether the second region belongs to the same chunk, and split the second region across chunk boundaries into sub-regions if the region covers multiple non-contiguous chunks.

In step 1010, the compiler can determine, from the region of input data array, a subset of the input data elements to multiply with the each weight data element to compute partial sums, the subset being determined based on the coordinates of the each weight data element and the stride of the convolution operation. Specifically, the compiler can shift the region (or the sub-regions) by an offset based on the coordinates of the each weight data element, and align a stride pattern over the shifted region to identify the subset of the input data elements that overlap with the weight data element.

In step 1012, the compiler can determine, for the each weight data element of the weight data array, destination addresses of the summation buffer to receive the partial sums, the destination addresses being determined based on the subset of input data elements for the each weight data element determined in step 906. For example, referring to FIG. 6A-FIG. 6C, based on the coordinates of the subset of input data elements, the compiler can determine a number of zero partial sums, a number of the partial sums to be sent to the summation buffer, etc. Based on these information, the compiler can determine a start destination address as well as a count of destination addresses for receiving the partial sums.

In step 1014, the compiler can generate one or more computation instructions for each weight data element of the weight data array to include fourth information indicative of the destination addresses and the subset of input data elements. In a case where the projected region overlaps multiple non-contiguous chunks, the compiler can generate multiple computation instructions, with each instruction selecting a different subset of input data elements in a contiguous memory region to multiply with that weight data element. The information may include, for example, a start source address and a count of the input data elements based on the projection operation in step 1008. The information may also include, for example, a start destination address, a step of one to indicate no gap between adjacent destination addresses, and a count of the destination addresses, based on the operation in step 908. The computation instruction may also include an address of the each weight data element in the memory based on the coordinates of the each weight data element in the weight data array.

Figure 11:
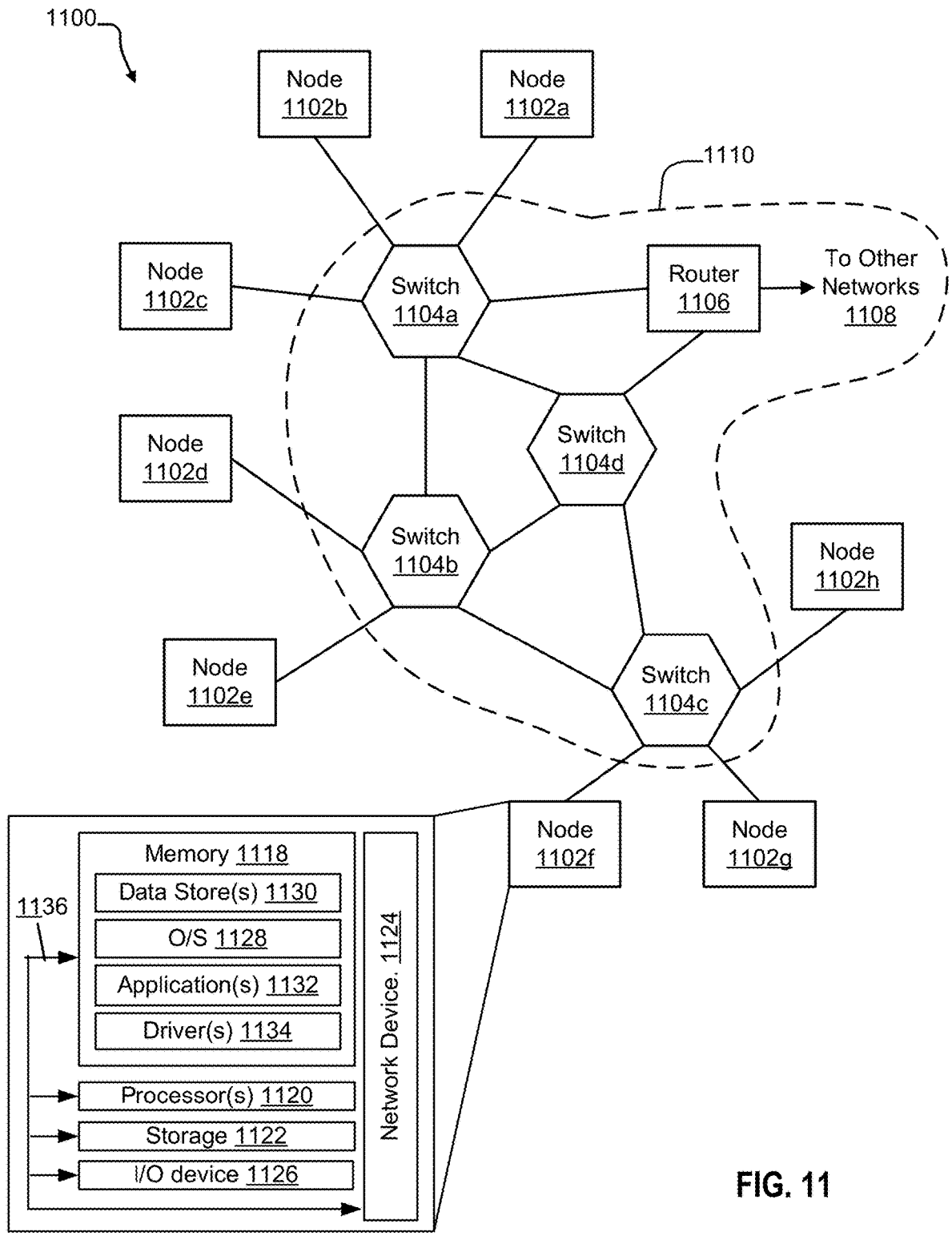
FIG. 11 includes a diagram of an example network.

FIG. 11 includes a diagram of an example network 1100, which can include one or more host systems, such as the host system illustrated in FIG. 8. For example, the example network 1100 of FIG. 11 includes multiple nodes 1102a-1102h, one or more of which can be a host system such as is illustrated in FIG. 8. Others of the nodes 1102a-1102h can be other computing devices, each of which include at least a memory for storing program instructions, a processor for executing the instructions, and a network interface for connecting to the network 1100.

In various examples, the network 1100 can be used to process data. For example, input data can be received at one of the nodes 1102a-1102h or from other networks 1108 with which the network 1100 can communicate. In this example, the input data can be directed to a node in the network 1100 that includes an acceleration engine, for the acceleration engine to operate on and produce a result. The result can then be transferred to the node or other network from which the input data was received. In various examples, input data can be accumulated from various sources, including one or more of the nodes 1102a-1102h and/or computing devices located in the other networks 1108, and the accumulated input data can be directed to one or more host systems in the network 1100. Results from the host systems can then be distributed back to the sources from which the input data was gathered.

In various examples, one or more of the nodes 1102a-1102h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 11, the nodes 1102a-1102h are connected to one another using a switched architecture with point-to point links. The switched architecture includes multiple switches 1104a-1104d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1104a-1104d of FIG. 11 may be connected to the nodes 1102a-1102h and provide multiple paths between any two nodes.

The network 1100 may also include one or more network devices for connection with other networks 1108, such as a router 1106. Routers use headers and forwarding tables to determine the best path for forwarding the packets, and use protocols such as internet control message protocol (ICMP) to communicate with each other and configure the best route between any two devices. The router 1106 of FIG. 11 can be used to connect to other networks 1108 such as subnets, LANs, wide area networks (WANs), and/or the Internet.

In some examples, network 1100 may include any one or a combination of many different types of networks, such as cable networks, the Internet, wireless networks, cellular networks and other private and/or public networks. The interconnected switches 1104a-1104d and the router 1106, if present, may be referred to as a switch fabric 1110, a fabric, a network fabric, or simply a network. In the context of a computer network, terms "fabric" and "network" may be used interchangeably herein.

The nodes 1102a-1102h may be any combination of host systems, processor nodes, storage subsystems, and I/O chassis that represent user devices, service provider computers or third party computers.

User devices may include computing devices to access an application 1132 (e.g., a web browser or mobile device application). In some aspects, the application 1132 may be hosted, managed, and/or provided by a computing resources service or service provider. The application 1132 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1108. Additionally, the user device(s) may be part of the distributed system managed by, controlled by, or otherwise part of the service provider computer(s) (e.g., a console device integrated with the service provider computers).

The node(s) of FIG. 11 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1132 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1102a-1102h may include at least one memory 1118 and one or more processing units (or processor(s) 1120). The processor(s) 1120 may be implemented in hardware, computer-executable instructions, firmware, or combinations thereof. Computer-executable instruction or firmware implementations of the processor(s) 1120 may include computer-executable or machine-executable instructions written in any suitable programming language to perform the various functions described.

In some instances, the hardware processor(s) 1120 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1118 may store program instructions that are loadable and executable on the processor(s) 1120, as well as data generated during the execution of these programs. Depending on the configuration and type of the node(s) 1102a-1102h, the memory 1118 may be volatile (such as RAM) and/or non-volatile (such as ROM, flash memory, etc.). The memory 1118 may include an operating system 1128, one or more data stores 1130, one or more application programs 1132, one or more drivers 1134, and/or services for implementing the features disclosed herein.

The operating system 1128 may support nodes 1102a-1102h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1128 may also be a proprietary operating system.

The data stores 1130 may include permanent or transitory data used and/or operated on by the operating system 1128, application programs 1132, or drivers 1134. Examples of such data include web pages, video data, audio data, images, user data, and so on. The information in the data stores 1130 may, in some implementations, be provided over the network(s) 1108 to user devices. In some cases, the data stores 1130 may additionally or alternatively include stored application programs and/or drivers. Alternatively or additionally, the data stores 1130 may store standard and/or proprietary software libraries, and/or standard and/or proprietary application user interface (API) libraries. Information stored in the data stores 1130 may be machine-readable object code, source code, interpreted code, or intermediate code.

The drivers 1134 include programs that may provide communication between components in a node. For example, some drivers 1134 may provide communication between the operating system 1128 and additional storage 1122, network device 1124, and/or I/O device 1126. Alternatively or additionally, some drivers 1134 may provide communication between application programs 1132 and the operating system 1128, and/or application programs 1132 and peripheral devices accessible to the service provider computer. In many cases, the drivers 1134 may include drivers that provide well-understood functionality (e.g., printer drivers, display drivers, hard disk drivers, Solid State Device drivers). In other cases, the drivers 1134 may provide proprietary or specialized functionality.

The service provider computer(s) or servers may also include additional storage 1122, which may include removable storage and/or non-removable storage. The additional storage 1122 may include magnetic storage, optical disks, solid state disks, flash memory, and/or tape storage. The additional storage 1122 may be housed in the same chassis as the node(s) 1102a-1102h or may be in an external enclosure. The memory 1118 and/or additional storage 1122 and their associated computer-readable media may provide non-volatile storage of computer-readable instructions, data structures, program modules, and other data for the computing devices. In some implementations, the memory 1118 may include multiple different types of memory, such as SRAM, DRAM, or ROM.

The memory 1118 and the additional storage 1122, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1118 and the additional storage 1122 are examples of computer storage media. Additional types of computer storage media that may be present in the node(s) 1102a-1102h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1102a-1102h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1102a-1102h may also include I/O device(s) 1126, such as a keyboard, a mouse, a pen, a voice input device, a touch input device, a display, speakers, a printer, and the like. The node(s) 1102a-1102h may also include one or more communication channels 1136. A communication channel 1136 may provide a medium over which the various components of the node(s) 1102a-1102h can communicate. The communication channel or channels 1136 may take the form of a bus, a ring, a switching fabric, or a network.

The node(s) 1102a-1102h may also contain network device(s) 1124 that allow the node(s) 1102a-1102h to communicate with a stored database, another computing device or server, user terminals and/or other devices on the network(s) 1100.

In some implementations, the network device 1124 is a peripheral device, such as a PCI-based device. In these implementations, the network device 1124 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1124 may be connected to a computing system using a PCIe interface.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for performing a convolution operation in a neural network accelerator, comprising:
   loading a first weight data element of an array of weight data elements from a memory into a systolic array of the neural network accelerator, the first weight data element being at first coordinates and associated with a first input channel within the array of weight data elements;
   receiving a first subset of input data elements of an array of input data elements to multiply with the first weight data element to generate a first output tile of an output data array, the first subset of input data elements being selected from a first contiguous region of the memory and based on the first coordinates of the first weight data element, a stride of the convolution operation, and a location of the first output tile in the output data array;
   streaming each input data element of the first subset from the first contiguous region of the memory into the systolic array to multiply with the first weight data element to generate the first output tile;
   receiving a selection of a second subset of the input data elements to multiply with the first weight data element to generate a second output tile of the output data array, the second subset being selected from a second contiguous region of the memory and based on the first coordinates of the first weight data element and on the stride of the convolution operation;
   streaming each input data element of the second subset from the second contiguous region into the systolic array to multiply with the first weight data element to generate the second output tile; and
   assembling an output data array of the convolution operation from the first output tile and the second output tile.

2. The method of claim 1, wherein the memory comprises a plurality of partitions;
   wherein each partition of the plurality of partitions stores a part of a chunk of input data elements of one or more input channels, the chunk of the input data elements being stored across the plurality of partitions following a repetitive sequential order;
   wherein the first contiguous region stores a first part of a first chunk of input data elements, the first part of the first chunk corresponding to the first input channel;
   wherein the second contiguous region stores a first part of a second chunk of input data elements, the first part of the second chunk corresponding to the first input channel; and
   the first contiguous region and the second contiguous region are in a first partition of the plurality of partitions.

3. The method of claim 2, wherein:
   the first partition also stores part of a first part of a third chunk of input data elements, the first part of the third chunk corresponding to a different input channel from the first input channel; and
   the first contiguous region and the second contiguous region are separated by the first part of the third chunk of input data elements.

4. The method of claim 3, wherein:
   each input data element of the array of input data elements is associated with an identifier of the chunk that includes the each input data element and a location of the chunk in the memory; and
   the first subset of input data elements are selected based on one or more identifiers of one or more chunks that include the first subset of input data elements and one or more locations of the one or more chunks indicating that the first subset of input data elements are stored in a contiguous region of the memory.

5. The method of claim 3, further comprising:
   storing, at different times, the first output tile and the second output tile at a summation buffer;
   wherein a size of the chunk of input data elements is based on a size of the summation buffer and the stride of the convolution operation.

6. A non-transitory computer readable medium storing instructions that, when executed by one or more hardware processors, cause the one or more hardware processors to:
   load a first weight data element of an array of weight data elements from a memory into a systolic array, the first weight data element having first coordinates in the array of weight data elements;

extract, from the instructions, information indicating a first number of input data elements to be obtained from a first address of the memory and a second number of input data elements to be skipped between adjacent input data elements to be obtained, the first address being based on the first coordinates, and the first and second numbers being based on a stride of a convolution operation;

based on the information, obtain first input data elements from the first address of the memory;

load the first input data elements into the systolic array; and control the systolic array to perform first computations based on the first weight data element and the first input data elements to generate first output data elements of an output data array.

7. The non-transitory computer readable medium of claim 6, wherein the input data elements are stored in the memory following at least one of: a row-major order or a column-major order.

8. The non-transitory computer readable medium of claim 6, wherein:
the memory comprises a plurality of partitions;
each partition is coupled with a row of the systolic array;
each partition stores input data elements of one or more input channels; and
the first input data elements are obtained from a first partition of the plurality of partitions and are streamed into a first row of the systolic array.

9. The non-transitory computer readable medium of claim 8, wherein the convolution operation is between the array of weight data elements and an array of input data elements;
wherein the array of input data elements comprises input data elements associated with a plurality of input data channels and is fragmented into a plurality of chunks, each chunk of the plurality of chunks comprising a subset of the array of input data elements and associated with at least a subset of a plurality of input channels; and
wherein each partition of the plurality of partitions stores input data elements associated with an input channel of the each chunk in a contiguous region.

10. The non-transitory computer readable medium of claim 9, wherein each input data element of the array of input data elements is associated with an attribute comprising:
an identifier of a chunk of the plurality of the chunks that includes the each input data element, and
a location of the chunk in the memory.

11. The non-transitory computer readable medium of claim 10, wherein the plurality of chunks comprise:
a first chunk of input data elements associated with a first subset of the plurality of input channels;
a second chunk of input data elements associated with the first subset of the plurality of input channels; and
a third chunk of input data elements associated with a second subset of the plurality of input channels.

12. The non-transitory computer readable medium of claim 11, wherein the attributes of the first input data elements indicate:
the first input data elements are included in the first chunk and the second chunk; and
the first chunk and the second chunk are stored in a first contiguous region in the first partition; and
wherein the first address is part of the first contiguous region.

13. The non-transitory computer readable medium of claim 12, wherein input data elements of the first chunk, the second chunk, and the third chunk are stored in a contiguous region in the each partition;
wherein input data elements of the first chunk and of the second chunk are separated by input data elements of the third chunk in the contiguous region in the each partition; and
wherein the attributes of the first input data elements include the identifier of the first chunk but not the second chunk.

14. The non-transitory computer readable medium of claim 11, wherein the instructions, when executed by one or more hardware processors, further cause the one or more hardware processors to:
control the systolic array to perform the first computations based on the first weight data element and the first input data elements to generate a first output tile comprising the first output data elements;
obtain second input data elements from the second chunk;
control the systolic array to perform second computations based on the first weight data element and the second input data elements to generate a second output tile comprising second output data elements; and
assemble the output data array from the first output tile and the second output tile.

15. The non-transitory computer readable medium of claim 14, wherein the instructions, when executed by one or more hardware processors, further cause the one or more hardware processors to store, at different times, the first output tile and the second output tile in a summation buffer; and
wherein a size of the first chunk and a size of the second chunk is based on a size of summation buffer, and the stride of the convolution operation.

16. An apparatus comprising:
a memory that stores a set of instructions;
one or more hardware processors configured to execute the set of instructions to:
receive first information indicative of a convolution operation to be performed by a systolic array based on a weight data array and an input data array to generate an output data array;
receive second information indicating a dimension of a summation buffer;
determine third information indicative of a memory location of each input data element of the input data array in a memory;
determine, for each weight data element of the weight data array, a region of the input data array to provide input data elements for generation of an output tile, the region of the input data array being determined based on a projection operation from the summation buffer and based on the region of the input data array being stored in a contiguous region of the memory;
determine, from the region of the input data array, a subset of the input data elements to multiply with the each weight data element to compute partial sums, the subset being determined based on coordinates of the each weight data element and a stride of the convolution operation;
determine, for the each weight data element of the weight data array, destination addresses of the summation buffer to receive the partial sums based on the subset of the input data elements; and
generate one or more computation instructions for the each weight data element of the weight data array to include fourth information indicative of the destination addresses and the subset of the input data elements.

17. The apparatus of claim 16, wherein the one or more hardware processors are configured to execute the set of instructions to, for the each weight data element:
    determine, based on the dimension of the summation buffer and the stride of the convolution operation, a first projected region that aligns a first input data element of the input data array;
    shift the first projected region based on the coordinates of the each weight data element;
    determine, based on memory locations of input data elements of the input data array in the memory and from the shifted first projected region, a second projected region of the input data array that includes only input data elements stored in contiguous region of the memory;
    align a stride pattern with the second projected region, the stride pattern being based on a stride of the convolution operation;
    determine, based on the dimension of the summation buffer and the second projected region, coordinates of input data elements of the input data array that overlap with the stride pattern; and
    determine the subset of input data elements for the each weight data element based on the coordinates.

18. The apparatus of claim 17, wherein the input data array is fragmented into a plurality of chunks in the memory, each chunk being associated with a chunk identifier;
    wherein each input data element of the input data array is associated with an attribute comprising:
        an identifier of a chunk of the plurality of the chunks that includes the each input data element, and
        a location of the chunk in the memory; and
    wherein determining the second projected region of the input data array comprises determining, based on the attributes of the input data elements included in the second projected region, that the input data elements included in the second projected region are stored in the contiguous region of the memory.

19. The apparatus of claim 17, wherein the one or more hardware processors are configured to execute the set of instructions to, for a first weight data element:
    determine, based on the memory locations of the input data elements and from the shifted first projected region, a first sub-region of the input data array that includes input data elements stored in a first contiguous region of the memory and a second sub-region of the input data array that includes input data elements stored in a second contiguous region of the memory;
    align the stride pattern with the first sub-region to determine a first subset of input data elements;
    align the stride pattern with the second sub-region to determine a second subset of input data elements;
    generate a first computation instruction including a first address of the first subset of input data elements to compute a first output tile from the first subset of input data elements; and
    generate a second computation instruction including a second address of the second subset of input data elements to compute a second output tile from the second subset of input data elements.

20. The apparatus of claim 17, wherein the one or more hardware processors are configured to execute the set of instructions to determine, for the each weight data element of the weight data array, the destination addresses of the summation buffer based on locations of the subset of input data elements in the input data array.

* * * * *